United States Patent
Bixby et al.

(10) Patent No.: US 7,555,504 B2
(45) Date of Patent: Jun. 30, 2009

(54) MAINTENANCE OF A FILE VERSION SET INCLUDING READ-ONLY AND READ-WRITE SNAPSHOT COPIES OF A PRODUCTION FILE

(75) Inventors: Peter Bixby, Westborough, MA (US); Sachin Mullick, Ashland, MA (US); Jiannan Zheng, Ashland, MA (US); Xiaoye Jiang, Shrewsbury, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1010 days.

(21) Appl. No.: 10/668,546

(22) Filed: Sep. 23, 2003

(65) Prior Publication Data

US 2005/0065986 A1 Mar. 24, 2005

(51) Int. Cl.
*G06F 17/30* (2006.01)
(52) U.S. Cl. .................. 707/203; 707/10; 707/204; 707/205; 711/162
(58) Field of Classification Search ............. 707/10, 707/203, 205; 711/162
See application file for complete search history.

(56) References Cited

U.S. PATENT DOCUMENTS

| | | | |
|---|---|---|---|
| 5,155,845 A | 10/1992 | Beal et al. ............. | 395/575 |
| 5,175,837 A | 12/1992 | Arnold et al. ........... | 395/425 |
| 5,175,852 A | 12/1992 | Johnson et al. .......... | 395/600 |
| 5,218,695 A | 6/1993 | Noveck et al. .......... | 395/600 |
| 5,375,232 A | 12/1994 | Legvold et al. ......... | 395/575 |
| 5,379,412 A | 1/1995 | Eastridge et al. ........ | 395/575 |
| 5,551,030 A | 8/1996 | Linden et al. | |
| 5,701,516 A | 12/1997 | Cheng et al. ........... | 395/842 |
| 5,819,292 A | 10/1998 | Hitz et al. ............. | 707/203 |
| 5,835,953 A | 11/1998 | Ohran ................. | 711/162 |
| 5,893,086 A | 4/1999 | Schmuck et al. | |
| 5,893,140 A | 4/1999 | Vahalia et al. .......... | 711/118 |
| 5,915,264 A | 6/1999 | White et al. ........... | 711/168 |
| 5,940,838 A | 8/1999 | Schmuck et al. | |
| 5,940,840 A | 8/1999 | Eshel et al. | |

(Continued)

OTHER PUBLICATIONS

EMC Celerra SE5 File Server, EMC Corporation, Hopkinton, Mass. 01748-9103, 2002, 2 pages.

(Continued)

*Primary Examiner*—Etienne P LeRoux
*Assistant Examiner*—Monica M Pyo
(74) *Attorney, Agent, or Firm*—Richard Auchterlonie; Novak Druce & Quigg, LLP

(57) ABSTRACT

Read-only and read-write snapshot copies of a production file in a Unix-based file system are organized as a version set of file inodes and shared file blocks. Version pointers and branch pointers link the inodes. Initially the production file can have all its blocks preallocated or it can be a sparse file having only an inode and its last data block. A protocol is provided for creating read-only and read-write snapshots, deleting snapshots, restoring the production file with a specified snapshot, refreshing a specified snapshot, and naming the snapshots. Block pointers are marked with a flag indicating whether or not the pointed-to block is owned by the parent inode. A non-owner marking is inherited by all of the block's descendants. The block ownership controls the copying of indirect blocks when writing to the production file, and also controls deallocation and passing of blocks when deleting a read-only snapshot.

17 Claims, 26 Drawing Sheets

U.S. PATENT DOCUMENTS

| | | | |
|---|---|---|---|
| 5,940,841 A | 8/1999 | Schmuck et al. | |
| 5,946,686 A | 8/1999 | Schmuck et al. | |
| 5,950,199 A | 9/1999 | Schmuck et al. | |
| 5,956,734 A | 9/1999 | Schmuck et al. | |
| 5,960,446 A | 9/1999 | Schmuck et al. | |
| 5,963,962 A | 10/1999 | Hitz et al. | 707/202 |
| 5,963,963 A | 10/1999 | Schmuck et al. | |
| 5,974,424 A | 10/1999 | Schmuck et al. | |
| 5,987,477 A | 11/1999 | Schmuck et al. | |
| 5,999,976 A | 12/1999 | Schmuck et al. | |
| 6,021,508 A | 2/2000 | Schmuck et al. | |
| 6,023,706 A | 2/2000 | Schmuck et al. | |
| 6,032,216 A | 2/2000 | Schmuck et al. | |
| 6,061,770 A | 5/2000 | Franklin | 711/162 |
| 6,076,148 A | 6/2000 | Kedem | 711/162 |
| 6,269,431 B1 | 7/2001 | Dunham | 711/162 |
| 6,279,011 B1 | 8/2001 | Muhlestein | 707/204 |
| 6,324,581 B1 | 11/2001 | Xu et al. | 709/229 |
| 6,434,681 B1 * | 8/2002 | Armangau | 711/162 |
| 6,462,263 B2 * | 10/2002 | Matsumoto et al. | 84/609 |
| 6,549,992 B1 | 4/2003 | Armangau et al. | 711/162 |
| 6,618,794 B1 | 9/2003 | Sicola et al. | 711/154 |
| 6,622,259 B1 | 9/2003 | Schmuck | |
| 6,708,175 B2 | 3/2004 | Curran et al. | |
| 6,748,504 B2 | 6/2004 | Sawdon et al. | |
| 6,792,518 B2 | 9/2004 | Armangau et al. | 711/162 |
| 6,820,122 B1 | 11/2004 | Mandler et al. | |
| 6,826,570 B1 | 11/2004 | Eshel et al. | |
| 6,829,617 B2 * | 12/2004 | Sawdon et al. | 707/102 |
| 6,829,678 B1 | 12/2004 | Sawdon et al. | |
| 6,892,211 B2 * | 5/2005 | Hitz et al. | 707/202 |
| 6,928,459 B1 | 8/2005 | Sawdon et al. | |
| 6,934,822 B2 | 8/2005 | Armangau et al. | 711/162 |
| 6,957,362 B2 | 10/2005 | Armangau | 714/20 |
| 6,959,310 B2 | 10/2005 | Eshel et al. | |
| 6,973,542 B1 | 12/2005 | Schmuck et al. | |
| 6,990,478 B2 | 1/2006 | Loy et al. | |
| 7,010,528 B2 | 3/2006 | Curran et al. | |
| 7,024,582 B2 | 4/2006 | Loy et al. | |
| 7,035,881 B2 | 4/2006 | Tammala et al. | 707/204 |
| 7,043,503 B2 | 5/2006 | Haskin et al. | |
| 7,072,894 B2 | 7/2006 | Loy et al. | |
| 7,085,785 B2 | 8/2006 | Sawdon et al. | |
| 7,085,815 B2 | 8/2006 | Dixon et al. | |
| 7,092,976 B2 | 8/2006 | Curran et al. | |
| 7,111,014 B2 | 9/2006 | Sawdon et al. | |
| 7,111,291 B2 | 9/2006 | Loy et al. | |
| 7,120,650 B2 | 10/2006 | Loy et al. | |
| 7,120,693 B2 | 10/2006 | Chang et al. | |
| 7,216,135 B2 | 5/2007 | Sawdon et al. | |
| 7,234,077 B2 | 6/2007 | Curran et al. | |
| 7,325,064 B2 | 1/2008 | Eshel et al. | |
| 7,325,120 B2 | 1/2008 | Sawdon et al. | |
| 7,409,453 B2 | 8/2008 | Chang et al. | |
| 7,412,499 B2 | 8/2008 | Chang et al. | |
| 7,430,640 B2 | 9/2008 | Schmuck et al. | |
| 2003/0079102 A1 | 4/2003 | Lubbers et al. | 711/202 |
| 2003/0158873 A1 | 8/2003 | Sawdon et al. | 707/204 |
| 2003/0182253 A1 | 9/2003 | Chen et al. | 707/1 |
| 2004/0030727 A1 | 2/2004 | Armangau et al. | 714/6 |
| 2004/0030846 A1 | 2/2004 | Armangau et al. | 711/154 |
| 2004/0030951 A1 | 2/2004 | Armangau | 714/6 |
| 2004/0107222 A1 | 6/2004 | Venkatesh et al. | 707/200 |
| 2004/0267836 A1 | 12/2004 | Armangau et al. | 707/203 |
| 2005/0015663 A1 | 1/2005 | Armangau et al. | 714/15 |
| 2005/0065985 A1 | 3/2005 | Tummala et al. | 707/201 |

OTHER PUBLICATIONS

"Celerra File Server in the E-Infostructure," EMC Corporation, Hopkinton, Mass., 2000, 9 pages.

"Celerra File Server Architecture for High Availability," EMC Corporation, Hopkinton, Mass., Aug. 1999, 7 pages.

Chutani, Sailesh, et al., "The Episode File System," Carnegie Mellon University IT Center, Pittsburgh, PA, Jun. 1991, 18 pages.

Vahalia, Uresh, *UNIX Internals: The New Frontier*, Chapter 9, "File System Implementations," Prentice Hall, Inc., Upper Saddle River, New Jersey, pp. 261-289.

Helen S. Raizen and Stephen C. Schwarm, "*Building a Semi-Loosely Coupled Multiprocessor System Based on Network Process Extension*;" Pre-publication copy Jan. 29, 1991 (To be published by 1991 USENIX Symposium on Experiences with Distributed &Multiprocessor Systems), pp. 1-17.

Miruja et al., "*Design and Evaluation of the High Performance Multi-Processor Server*," Proceedings—IEEE International Conference on Computer Design: VLSI in Computers and Processors; Cambridge, Mass. Oct. 10-12, 1994, 1063-6404/94, 1994, IEEE, pp. 66-69.

"*Intel® Xeon™ Processor: Unparalleled Value and Flexibility for Small and Medium Business Server Applications*;" 2002, Intel Corporation (4 pages).

"*Intel® Server Board SE7500WV2: Superior Performance for Reliable and Manageable High-Density Solutions*;" 2002, Intel Corporation (6 pages).

"*Building Cutting-Edge Server Applications; Intel® Xeon™ Processor Family Features the Intel NetBurst™ Microarchitecture with Hyper-Threading Technology*;" 2002, Intel Corporation, pp. 1-9.

"*Intel® Pentium 4 and Intel® Xeon™ Processor Optimization*" Reference Manual, 2002, Intel Corporation, U.S.A., pp. i to xxv, 1-1 to 1-27, 2-1 to 2-75, 7-1 to 7-33.

Hennessy, John L., and Patterson, David A., *Computer Architecture: A Quantitative Approach*, Morgan Kaufmann Publishers, Inc., San Mateo, CA, 1990, pp. 250-284.

Troiani, Mario et al., "The VAX 8600 1 Box, A Pipelined Implementation of the VAX Architecture," *Digital Technical Journal*, No. 1, Aug. 1985, pp. 24-42.

\* cited by examiner

MAINTENANCE OF A FILE VERSION SET INCLUDING READ-ONLY AND READ-WRITE SNAPSHOT COPIES OF A PRODUCTION FILE

BACKGROUND OF THE INVENTION

1. Field of the Invention

The present invention relates to a file server maintaining snapshot copies of a read-write file by sharing file blocks and performing a copy-on-write to a newly allocated block when writing to a shared block.

2. Description of the Related Art

A technique known as file versioning maintains read-only versions of a read-write production file by sharing file blocks between the production file and the read-only versions, and performing a copy-on-write to a newly allocated block for the production file when writing to a shared block. Such a file system is described in Chutani, Sailesh, et al., "The Episode File System," Carnegie Mellon University IT Center, Pittsburgh, Pa., June 1991, incorporated herein by reference. Each read-only version is a snapshot of the production file at a respective point in time. Read-only versions can be used for on-line data backup and data mining tasks.

In a copy-on-write file versioning method, the read-only version initially includes only a copy of the inode of the production file. Therefore the read-only version initially shares all of the data blocks as well as any indirect blocks of the production file. When the production file is modified, new blocks are allocated and linked to the production file inode to save the new data, and the original data blocks are retained and linked to the inode of the read-only version. The result is that disk space is saved by only saving the difference between two consecutive versions. If the production file becomes corrupted during a system crash, then typically the most recent read-only version is copied over to the production file in a recovery operation. In this case, there is a loss of the data that was written to the production file since the creation of the most recent read-only version.

Users are becoming less tolerant of delays in accessing their data, and even less tolerant of corruption of their data. Therefore, there has been a continuing interest in improving data availability and the effectiveness of recovery procedures. For example, after recovery, the integrity of the recovered file is checked, and if a defect is found, an attempt is made to correct it. In addition, it is often possible to recover some of the data that was written to the production file since the creation of the latest read-only version, for example, by replay of a log from an application program.

SUMMARY OF THE INVENTION

In accordance with one aspect, the invention provides a file server. The file server includes storage containing a file system, and a processor coupled to the storage for accessing the file system. The file system includes a production file, read-only snapshot copies of the production file, and at least one read-write snapshot copy of the production file. The production file and the snapshot copies of the production file are organized as a version set including a node for the production file and a node for each snapshot copy of the production file, and a set of file blocks including direct and indirect blocks that are shared among the production file and the snapshot copies of the production file.

In accordance with another aspect, the invention provides a file server. The file server includes storage containing a file system, and a processor coupled to the storage for accessing the file system. The file system includes a production file, read-only snapshot copies of the production file, and at least one read-write snapshot copy of the production file. The production file and the snapshot copies of the production file are organized as a version set including a node for the production file and a node for each snapshot copy of the production file, and a set of file blocks including direct and indirect blocks that are shared among the production file and the snapshot copies of the production file. The file server further includes means for creating new read-only snapshot copies of the production file, means for creating new read-write snapshot copies of the production file, means for deleting a specified snapshot copy of the production file from the version set, means for restoring the production file with a specified snapshot copy of the production file, means for refreshing a specified snapshot copy of the production file, and means for naming the files in the version set.

In accordance with another aspect, the invention provides a file server. The file server includes storage containing a file system, and a processor coupled to the storage for accessing the file system. The file system includes a production file, and read-only snapshot copies of the production file. The production file and the read-only snapshot copies of the production file are organized as a version set including a node for the production file, a node for each read-only snapshot copy of the production file, and a set of file blocks including direct and indirect blocks that are shared among the production file and the read-only snapshot copies of the production file. The file server is programmed to maintain for each block in each version of the production file an indication of whether or not the version of the production file is an oldest version of the production file including an identical version of the block. The file server is programmed to delete a read-only snapshot copy of the production file, and when deleting the read-only snapshot copy of the production file, to keep each block for which the read-only snapshot copy is not indicated as being an oldest version of the production file including an identical version of the block.

In accordance with another aspect, the invention provides a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The file server is programmed for responding to a request to create a read-only snapshot copy of the production file by reserving for the production file a number of free file blocks of at least the number of blocks in the production file.

In accordance with another aspect, the invention provides a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The file server is programmed for restoring the production file with a specified snapshot copy of the production file by responding to a request to prepare to restore the production file by preparing to restore the production file and reporting whether or not preparation is successful, and then responding a request to commit the preparation by restoring the production file with the specified snapshot copy of the production file.

In accordance with another aspect, the invention provides a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The file server is programmed for refreshing a specified snapshot copy of the production file by creating a new node in the version set, copying contents of the node of the specified snapshot copy into the new node so that the new node references blocks of the specified snapshot copy, using the node of the specified snapshot copy to create a new snapshot copy of the production file by copying contents of the node of the production file into the node of the specified snapshot copy, and performing a file deletion upon the new node.

In accordance with another aspect, the invention provides a method of operating a file server. The file server includes storage containing a file system, and a processor coupled to the storage for accessing the file system. The file system includes a production file, and read-only snapshot copies of the production file. The production file and the read-only snapshot copies of the production file are organized as a version set including a node for the production file, a node for each read-only snapshot copy of the production file, and a set of file blocks including direct and indirect blocks that are shared among the production file and the read-only snapshot copies of the production file. The method includes maintaining for each block in each version of the production file an indication of whether or not the version of the production file is an oldest version of the production file including an identical version of the block. The method further includes deleting a read-only snapshot copy of the production file, wherein the deleting of the read-only snapshot copy of the production file includes keeping each block for which the read-only snapshot copy is not indicated as being an oldest version of the production file including an identical version of the block.

In accordance with another aspect, there is provided a method of operating a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The method includes the file server responding to a request to create a read-only snapshot copy of the production file, and when responding to the request to create a read-only snapshot copy of the production file, reserving for the production file a number of free file blocks of at least the number of blocks in the production file.

In accordance with yet another aspect, the invention provides a method of operating a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The method includes the file server restoring the production file with a specified snapshot copy of the production file by responding to a request to prepare to restore the production file by preparing to restore the production file and reporting whether or not preparation is successful, and then responding a request to commit the preparation by restoring the production file with the specified snapshot copy of the production file.

In accordance with a final aspect, there is provided a method of operating a file server. The file server includes storage containing a file system, and a processor coupled to the storage for accessing the file system. The file system includes a production file, and snapshot copies of the production file. The production file and the snapshot copies of the production file are organized as a version set including a node for the production file, a node for each snapshot copy of the production file, and a set of file blocks including direct and indirect blocks that are shared among the production file and the snapshot copies of the production file. The method includes the file server refreshing a specified snapshot copy of the production file by creating a new node in the version set, copying contents of the node of the specified snapshot copy into the new node so that the new node references blocks of the specified snapshot copy, using the node of the specified snapshot copy to create a new snapshot copy of the production file by copying contents of the node of the production file into the node of the specified snapshot copy, and performing a file deletion upon the new node.

BRIEF DESCRIPTION OF THE DRAWINGS

Other objects and advantages of the invention will become apparent upon reading the following detailed description with reference to the accompanying drawings wherein.

Figure 1:
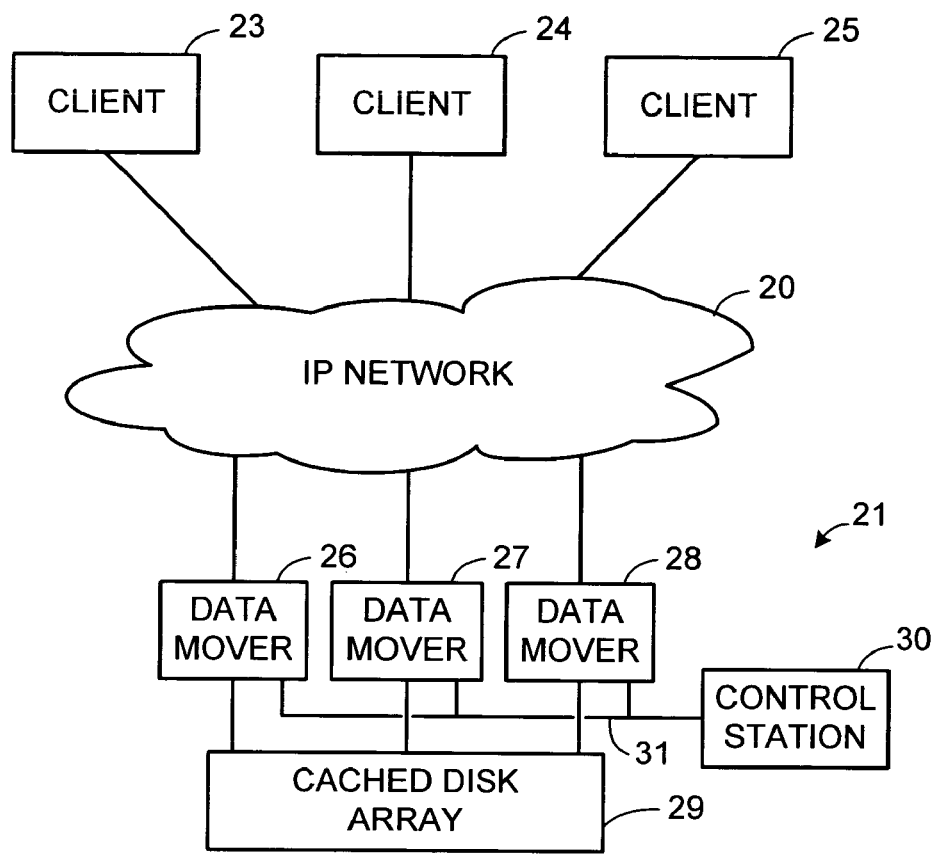
FIG. 1 is a block diagram of a data processing system including multiple clients and a network file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

I. The Preferred Network File Server.

FIG. 1 shows an Internet Protocol (IP) network 20 including a network file server 21 and multiple clients 23, 24, 25. The network file server 21, for example, has multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29.

Further details regarding the network file server 21 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 21 is managed as a dedicated network appliance, integrated with popular network operating systems in a way, which, other than its superior performance, is transparent to the end user. The clustering of the data movers 26, 27, 28 as a front end to the cached disk array 29 provides parallelism and scalability. Each of the data movers 26, 27, 28 is a high-end commodity computer, providing the highest performance appropriate for a data mover at the lowest cost. The data mover computers 26, 27, 28 may communicate with the other network devices using standard file access protocols such as the Network File System (NFS) or the Common Internet File System (CIFS) protocols, but the data mover computers do not necessarily employ standard operating systems. For example, the network file server 21 is programmed with a Unix-based file system that has been adapted for rapid file access and streaming of data between the cached disk array 29 and the data network 20 by any one of the data mover computers 26, 27, 28.

Figure 2:
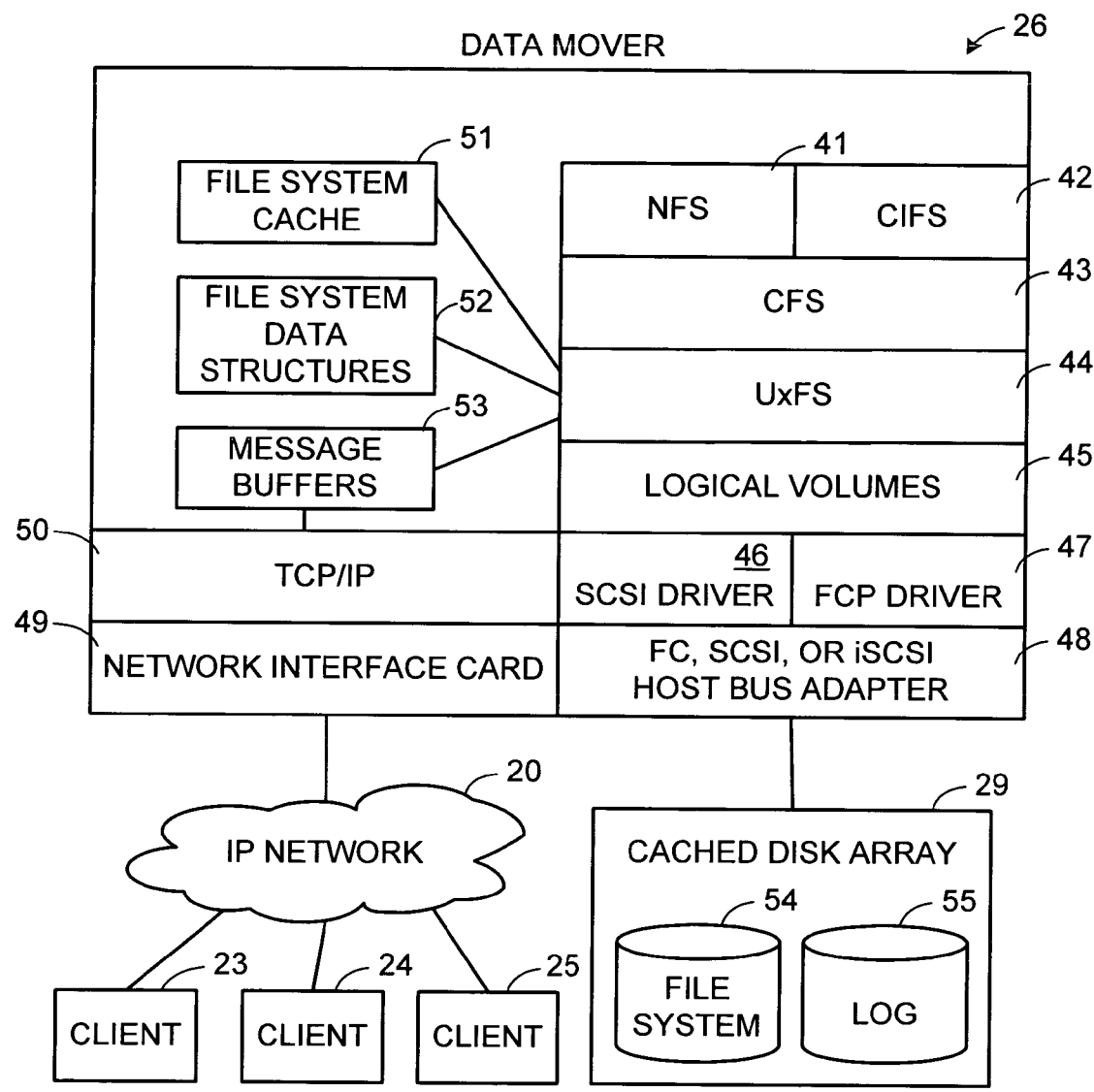
FIG. 2 is a block diagram showing further details of the network file server in the data processing system of FIG. 1.

FIG. 2 shows software modules in the data mover 26 introduced in FIG. 1. The data mover 26 has a Network File System (NFS) module 41 for supporting communication among the clients and data movers of FIG. 1 over the IP network 20 using the NFS file access protocol, and a Common Internet File System (CIFS) module 42 for supporting communication over the IP network using the CIFS file access protocol. The NFS module 41 and the CIFS module 42 are layered over a Common File System (CFS) module 43, and the CFS module is layered over a Universal File System (UxFS) module 44. The UxFS module supports a UNIX-based file system, and the CFS module 43 provides higher-level functions common to NFS and CIFS.

The UxFS module accesses data organized into logical volumes defined by a module 45. Each logical volume maps to contiguous logical storage addresses in the cached disk array 29. The module 45 is layered over a SCSI driver 46 and a Fibre-channel protocol (FCP) driver 47. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24, 25.

To maintain the file system 54 in a consistent state during concurrent writes to a file, the UxFS layer maintains file system data structures 52 in random access memory of the data mover 26. To enable recovery of the file system 54 to a consistent state after a system crash, the UxFS layer writes file metadata to a log 55 in the cached disk array during the commit of certain write operations to the file system 54.

II. Concurrent Read and Write Operations and the Allocation of File System Blocks.

Figure 3:
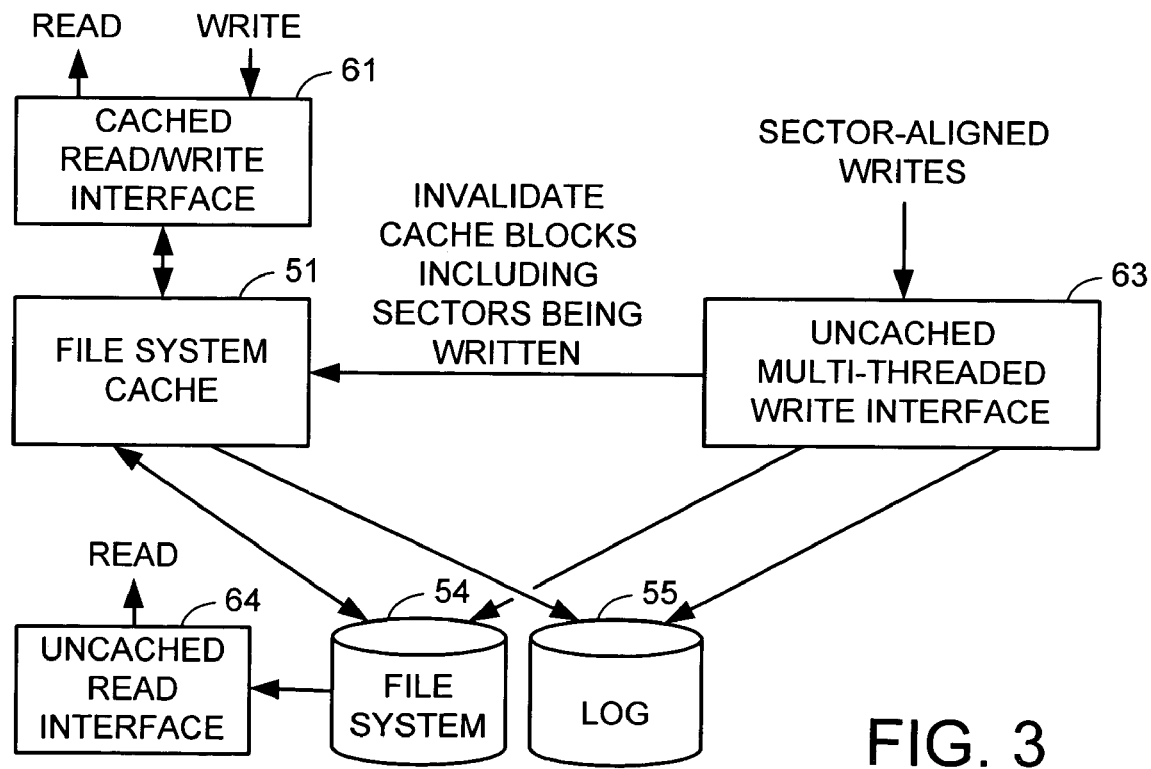
FIG. 3 is a block diagram of various read and write interfaces in a Unix-based file system layer (UxFS) in the network file server of FIG. 2.

FIG. 3 shows various read and write interfaces in the UxFS layer. These interfaces include a cached read/write interface

61 for accessing the file system cache 51, an uncached multi-threaded write interface 63, and an uncached read interface 64.

The cached read/write interface 61 permits reads and writes to the file system cache 51. If data to be accessed does not reside in the cache, it is staged from the file system 54 to the file system cache 51. Data written to the file system cache 51 from the cached read/write interface 61 is written down to the file system cache during a commit operation. The file data is written down first, followed by writing of new file metadata to the log 55 and then writing of the new metadata to the file system 54.

The uncached multi-threaded write interface 63 is used for sector-aligned writes to the file system 54. Sectors of data (e.g., 512 byte blocks) are read from the message buffers (53 in FIG. 2) and written directly to the cached disk array 29. For example, each file block is sector aligned and is 8 K bytes in length. When a sector-aligned write occurs, any cache blocks in the file system cache that include the sectors being written to are invalidated. In effect, the uncached multi-threaded write interface 63 commits file data when writing the file data to the file system 54 in storage. The uncached multi-threaded write interface 63 allows multiple concurrent writes to the same file. If a sector-aligned write changes metadata of a file such as file block allocations, then after the data of the file has been written, the new metadata is written to the log 55, and then the new metadata is written to the file system 54. The new metadata includes modifications to the file's inode, any new or modified indirect blocks, and any modified quota reservation.

The uncached read interface 64 reads sectors of data directly from the file system 54 into the message buffers (53 in FIG. 2). For example, the read request must have a sector aligned offset and specifies a sector count for the amount of data to be read. The data can be read into multiple message buffers in one input/output operation so long as the sectors to be read are in contiguous file system blocks.

Typically, the cached read/write interface 61 is used for reading data from read-write files and from any read-only snapshot copies of the read-write files. The uncached write interface 63 is used for sector-aligned writes to read-write files. If the writes are not sector aligned, then the cached read-write interface 61 is used. The uncached read interface 64 is used for sector-aligned reads when there is no advantage to retaining the data in the file system cache 51; for example, when streaming data to a remote copy of a file.

Figure 4:
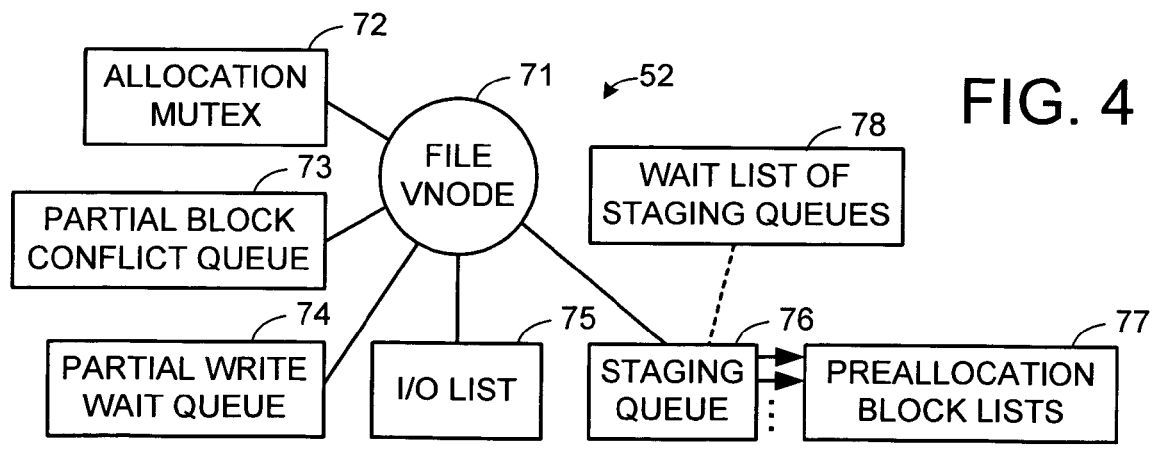
FIG. 4 shows various file system data structures associated with a file in the network file server of FIG. 2.
Figure 14:
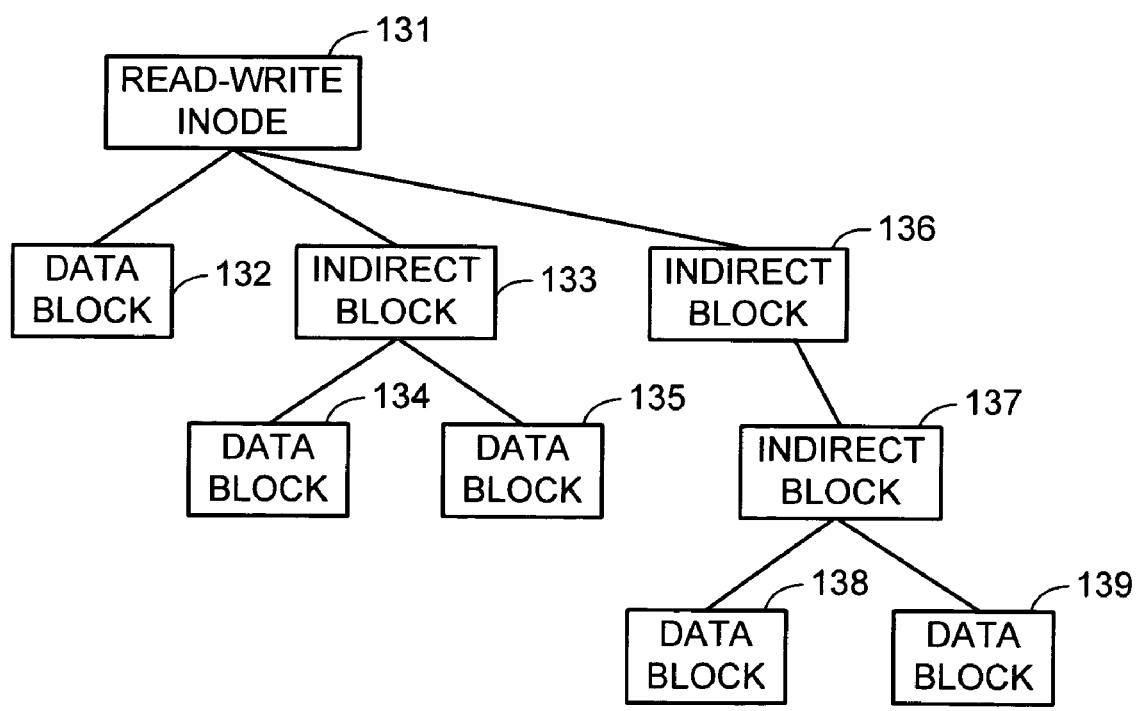
FIG. 14 is a block diagram of a read-write file as maintained by the UxFS layer.

FIG. 4 shows various file system data structures 52 associated with a file. A virtual inode (VNODE) 71 represents the file. The virtual inode 71 is linked to an allocation mutex (mutually exclusive lock) 72, a partial block conflict queue 73, a partial write wait queue 74, an input-output (I/O) list 75, a staging queue 76, and preallocation block lists 77. When a file block is preallocated, it is reserved for use in the on-disk file system 54. A preallocated file block can be linked into the in-memory file block structure in the file system cache 51 as maintained by the UxFS layer 44, and later the preallocated file block can become part of the on-disk file system 54 when the preallocated file block is committed to storage. (An example of the file block structure is shown in FIG. 14.) The write threads of the uncached multi-threaded write interface (63 in FIG. 3) use the allocation mutex 72 for serializing preallocation of file metadata blocks and commitment of the preallocated metadata blocks. For a Unix-based file, the preallocated metadata blocks include new indirect blocks, which are added to the file when the file is extended. As described below with reference to FIGS. 15 to 16, one or more new indirect blocks may also be added to a read-write file system when processing a client request to write to a data block that is shared between the read-write file system and a read-only snapshot copy of the read-write file system.

Preallocation of the file metadata blocks under control of the allocation mutex prevents multiple writers from allocating the same metadata block. The actual data write is done using asynchronous callbacks within the context of the thread, and does not hold any locks. Since writing to the on-disk storage takes the majority of the time, the preallocation method enhances concurrency, while maintaining data integrity.

The preallocation method allows concurrent writes to indirect blocks within the same file. Multiple writers can write to the same indirect block tree concurrently without improper replication of the indirect blocks. Two different indirect blocks will not be allocated for replicating the same indirect block. The write threads use the partial block conflict queue 73 and the partial write wait queue 74 to avoid conflict during partial block write operations, as further described below with reference to FIG. 13.

The I/O list 75 maps the message buffers (53 in FIG. 2) to data blocks to be written. The write threads use the I/O list 75 to implement byte range locking. The read threads may also use the I/O for byte-range locking. The data blocks, for example, are 512 bytes in length providing sector-level granularity for the byte range locking. Alternatively, the data block length is a multiple of the sector size.

In order to prevent the log (55 in FIG. 2) from becoming a bottleneck, the preallocated metadata blocks for multiple write threads writing to the file at the same time are committed together under the same logging lock. Committing more than one allocation under one lock increases the throughput. For this purpose, a staging queue 76 is allocated and linked to the file virtual inode 71. Preallocation block lists 77 identify the respective preallocated metadata blocks for the write threads writing to the file. The staging queue 76 receives pointers to the preallocation block lists 77 of the write threads waiting for the allocation mutex 72 of the file for commitment of their preallocated metadata blocks. For example, the staging queue 76 is a conventional circular queue, or the preallocation block lists 77 are linked together into a circular list to form the staging queue. There can be multiple files, and each file can have a respective staging queue waiting for commitment of the file's preallocation block lists. A wait list of staging queues 78 identifies the staging queues waiting for service on a first-come, first-served basis.

From a client's view, the write operation performed by a write thread in the uncached write interface is a synchronous operation. The write thread does not return an acknowledgement to the client until the write data has been written down to the file system in storage, and the metadata allocation has been committed to storage.

Figure 5:
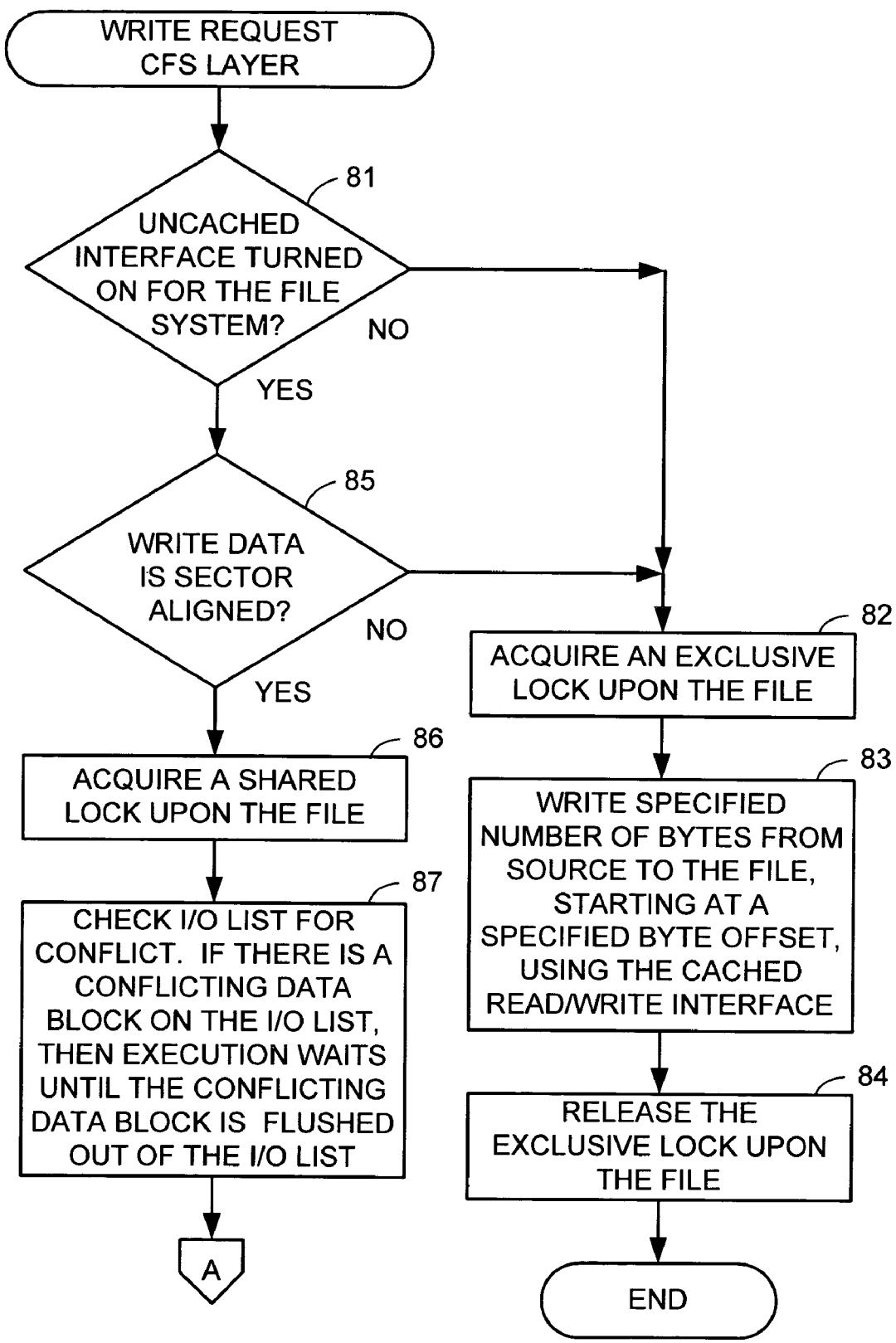
FIGS. 5 and 6 comprise a flowchart of programming in the Common File System (CFS) layer in the network file server for handling a write request from a client.
Figure 6:
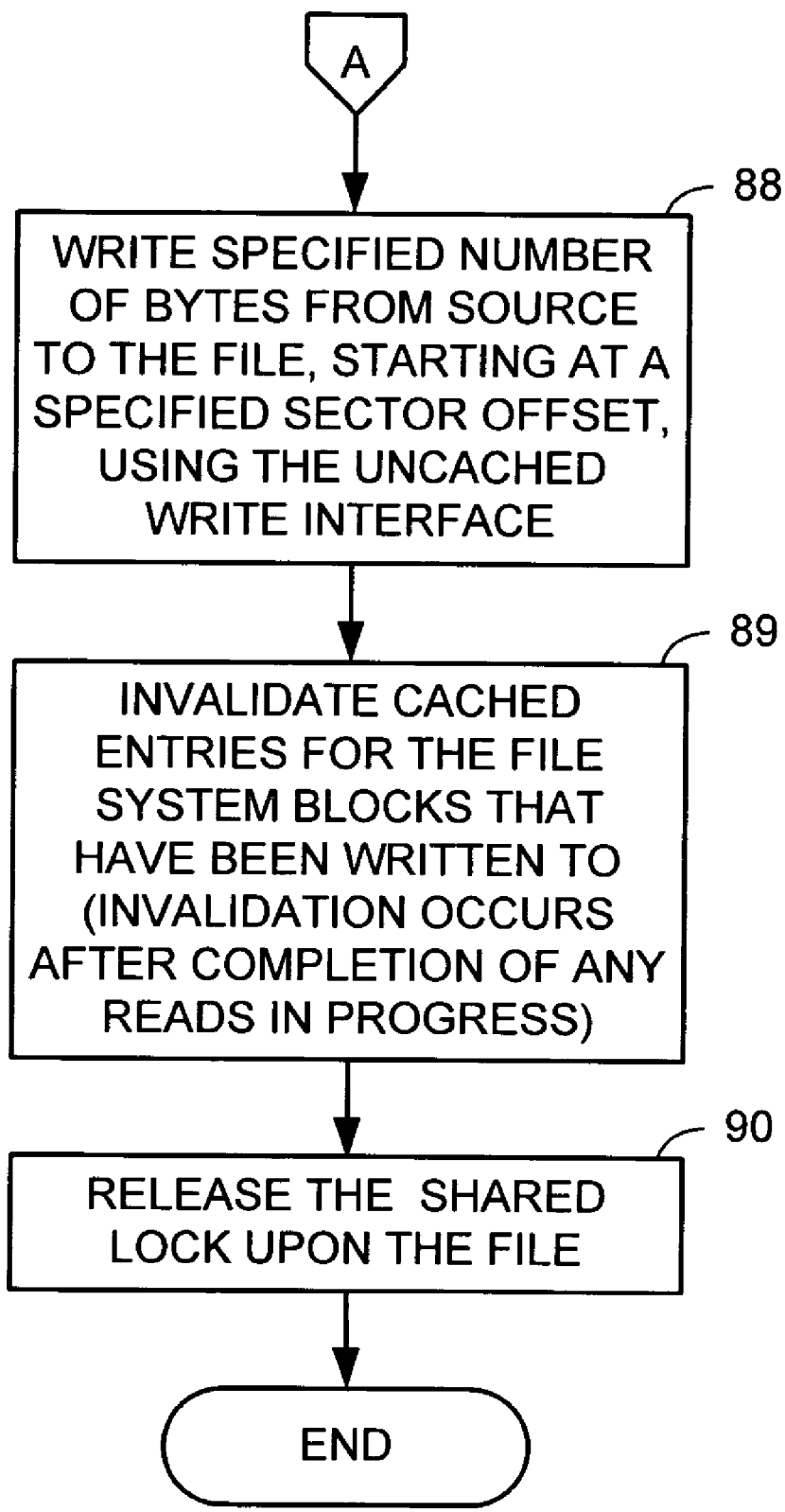

FIGS. 5 and 6 show programming in the Common File System (CFS) layer in the network file server for handling a write request from a client. In a first step 81, if the uncached multi-threaded write interface (63 in FIG. 3) is not turned on for the file system, then execution branches to step 82. For example, the uncached interface can be turned on or off per file system as a mount-time option. In step 82, the CFS layer obtains an exclusive lock upon the file, for example by acquiring the allocation mutex (72 in FIG. 4) for the file. Then in step 83, the CFS layer writes a specified number of bytes from the source to the file, starting at a specified byte offset, using the cached read/write interface (61 in FIG. 3). The source, for example, is one or more of the message buffers (53). Then in step 84, the CFS layer releases the exclusive lock upon the file, and processing of the write request is finished.

In step 81, if the uncached multi-threaded write interface is turned on for the file system, then execution continues to step 85. In step 85, if the write data specified by the write request is not sector aligned (or the data size is not in multiple sectors), then execution branches to step 82. Otherwise, execution continues from step 85 to step 86.

In step 86, the CFS layer acquires a shared lock upon the file. The shared lock prevents the CFS layer from obtaining an exclusive lock upon the file for a concurrent write request (e.g., in step 82). However, as described below, the shared lock upon the file does not prohibit write threads in the UxFS layer from acquiring the allocation mutex (72 in FIG. 4) during the preallocation of metadata blocks or during the commitment of the metadata blocks.

In step 87, the CFS layer checks the I/O list (75 in FIG. 4) for a conflict. If there is a conflicting data block on the I/O list, then execution waits until the conflicting data block is flushed out of the I/O list. For example, for serializing the writes with prior reads and writes, write access to any blocks being accessed by prior in-progress reads or writes is delayed until these blocks have been accessed by these prior in-progress reads or writes. Moreover, in certain clustered systems in which direct data access to the file in the data storage is shared with other servers or clients, execution may also wait in step 87 for range locks to be released by another server or client sharing direct access to the file. After step 87, execution continues to step 88 in FIG. 6.

In step 88 of FIG. 6, the CFS layer writes the specified number of bytes from the source to the file, starting at a specified sector offset, using the uncached multi-threaded write interface (63 in FIG. 3). Then in step 89, the CFS layer invalidates any cached entries for the file system blocks that have been written to in the file system cache (51 in FIG. 3). The invalidation occurs after completion of any reads in progress to these file system blocks. In step 90, the CFS layer releases the shared lock upon the file, and processing of the write request is finished.

Figure 7:
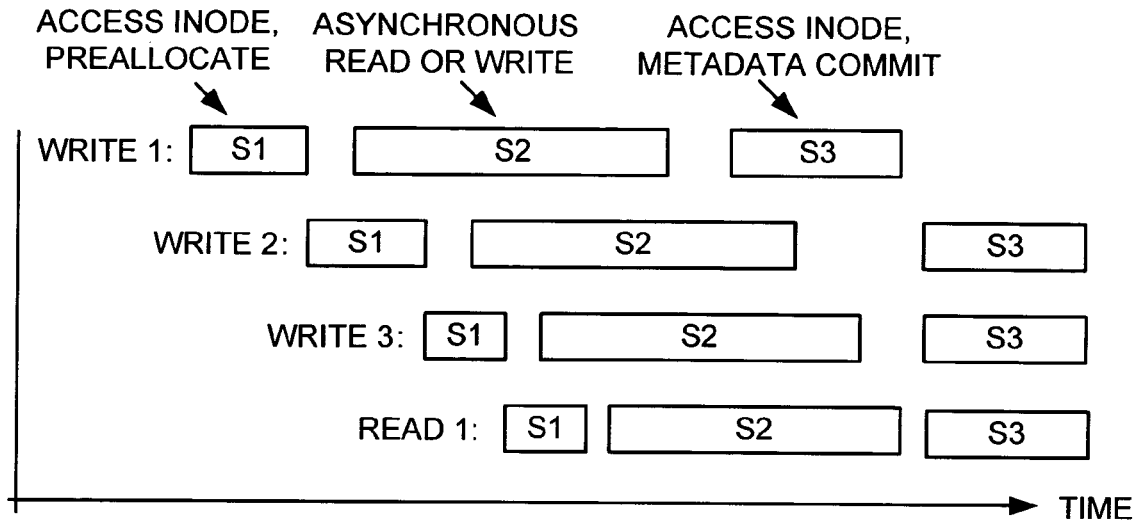
FIG. 7 is a timing diagram showing multiple read and write operations pipelined into parallel streams in the Common File System (CFS) layer in the network file server for handling concurrent write requests from a client.

FIG. 7 shows that the parallel read and write architecture can be used to achieve pipelining, since the data write stage does not involve any metadata interactions. The read or write is divided into three steps, namely inode access for reads and writes and preallocation for writes (S1), asynchronous read or write (S2), and inode access for reads and writes and commit for writes (S3). The preallocation in stage S1 is achieved synchronously, and the allocation mutex (72 in FIG. 4) prevents multiple preallocations from occurring simultaneously for the same file.

Once the metadata preallocation stage is complete, the asynchronous write (S2) of the data to disk can be handled independently of the metadata preallocation. The asynchronous write (in stage S2) of the data to disk is the longest stage. With pipelining, multiple asynchronous writes can be performed concurrently. This results in an increase in the number of write operations that can be performed in a given time period.

The final commit of the allocations (in stage S3) is also achieved synchronously. The allocation mutex (72 in FIG. 4) prevents preallocation for the same file from occurring at the same time as a commit for the same file. However, multiple commits (S3) for the same file may occur simultaneously by gathering the commit requests together and committing them under the same allocation mutex.

Figure 8:
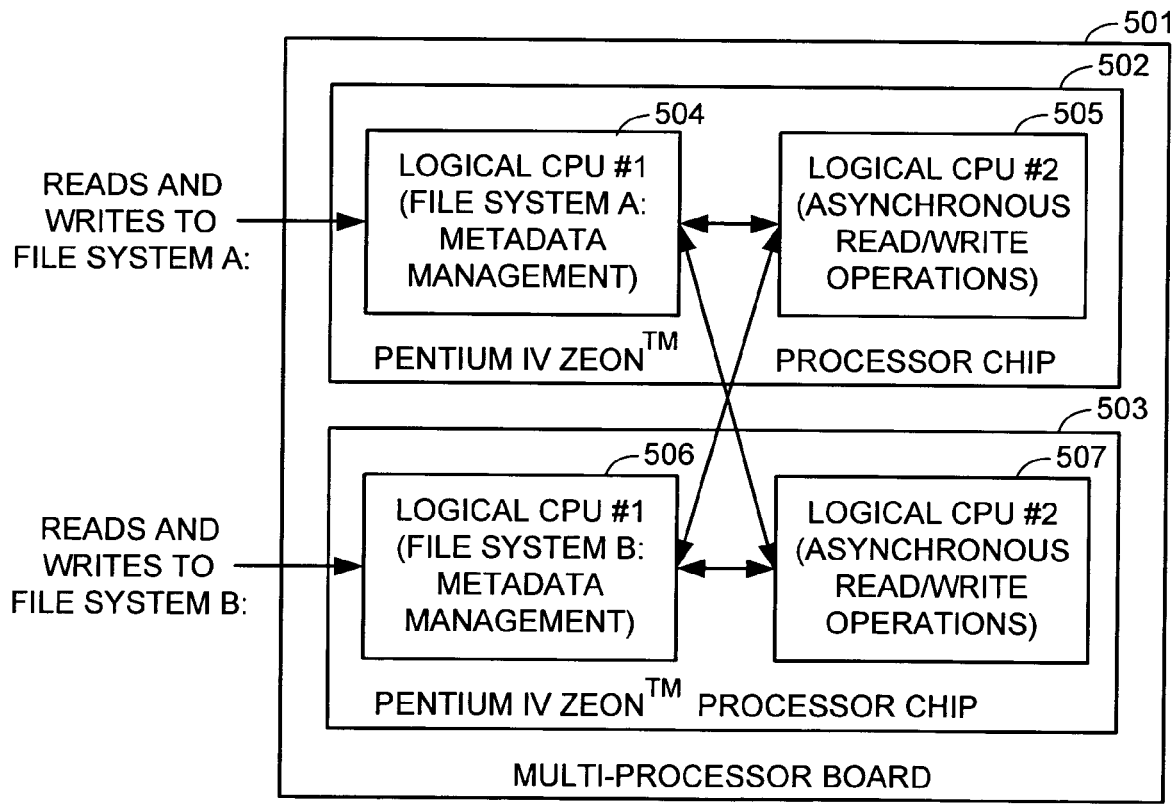
FIG. 8 shows multiple processors for processing the pipelined read and write operations in the network file server.

As shown in FIG. 8, the read and write operations can be pipelined through multiple processors. In this example, a multi-processor board 501 includes two Pentium IV Zeon™ processor chips 502, 503. Each processor chip includes two logical central processing units (CPU) 504, 505 and 506, 507 respectively. Each logical CPU consists of a respective set of on-chip processor registers that share the functional units, input-output ports and cache memory on the chip.

The processing of a multi-threaded application by the two logical processors on the same physical processor is called "Hyper-Threading technology." See, for example, "Building Cutting-Edge Server Applications, Intel® Xeon™ Processor Family Features the Intel NetBurst™ Microarchitecture with Hyper-Threading Technology," Intel Corporation, 2002, and Chapter 7, "Multiprocessor and Hyper-Threading Technology," in the Intel® Pentium™ 4 and Intel® Xeon™ Processor Optimization Reference Manual, Order No. 248966-05, Intel Corporation, 2002.

For pipelined processing of the multiple concurrent read and write operations as shown in FIG. 7, the metadata management for a file (stages S1 and S3) can be performed by one logical processor, and the asynchronous reads and writes (stage S2) can be performed by another logical processor. Each logical processor executes code threads that are independent of the code threads executed by the other logical processors. For example, as shown in FIG. 8, the first logical CPU 504 of the first processor chip 502 performs metadata management for files in a first file system (A:), and the first logical CPU 506 of the second processor chip 503 performs metadata management for files in a second file system (B:). The second logical CPU 504, 507 in each processor chip 502, 503 performs asynchronous write operations. For example, the second logical CPU 505 of the first processor chip 502 performs asynchronous read and write operations for the first file system (A:), and if the second logical CPU 505 has free processing time, then the second logical CPU 505 of the first processor chip 502 performs asynchronous read and write operations for the second file system (B:). In a similar fashion, the second logical CPU 507 of the second processor chip 502 performs asynchronous read and write operations for the second file system (B:), and if the second logical CPU 507 has free processing time, then the second logical CPU 505 of the first processor chip 502 performs asynchronous read and write operations for the first file system (A:).

In general, data read requests can be pipelined along with the write requests, and separate processing units can service data read and write requests generated by a primary processor that handles metadata management for each file. The primary processor can hand over an input/output list to a separate secondary processing unit that will then go through the input/output list to perform the transfer of data between the message buffers and cache or disk. For a write operation, the separate secondary processing unit will take the data from the network packets, write it to specified disk locations as requested by the primary, and complete the data write to the disk from the network packets. The pipeline architecture allows a primary processor to do the next write metadata preallocation while other secondary processors are still writing data to disk.

When a write I/O request arrives at a primary processor or thread, the request is analyzed and if there are any associated metadata operations (stage S1 in FIG. 7), and the associated metadata operations are executed by the primary processor while the block write I/O is pipelined to another separate secondary processing unit. The secondary processing unit will pipeline multiple block write I/Os (stage S2 in FIG. 7), and will commit the write data to the disk independently of the metadata operation. At the end of the write data commit process, the metadata is committed (stage S3 in FIG. 7) to disk as well. The primary processor is freed to perform additional metadata management operations while the secondary processing unit writes the I/O data to the disk.

There could be a pool of secondary logical processing units that execute the write tasks and they can be allocated for additional processing tasks by the primary processor. Some tasks are executed only by the primary processor. For example, a primary processor is allocated to a file system when the data mover is rebooted. The processing of the pipeline is based on the fact that the writes are uncached, and once an asynchronous write is issued to a secondary processor, there is no contingency or locking to the file. If there are any contingencies, then they are solved by the primary processor before the write is issued to the secondary processor.

Figure 9:
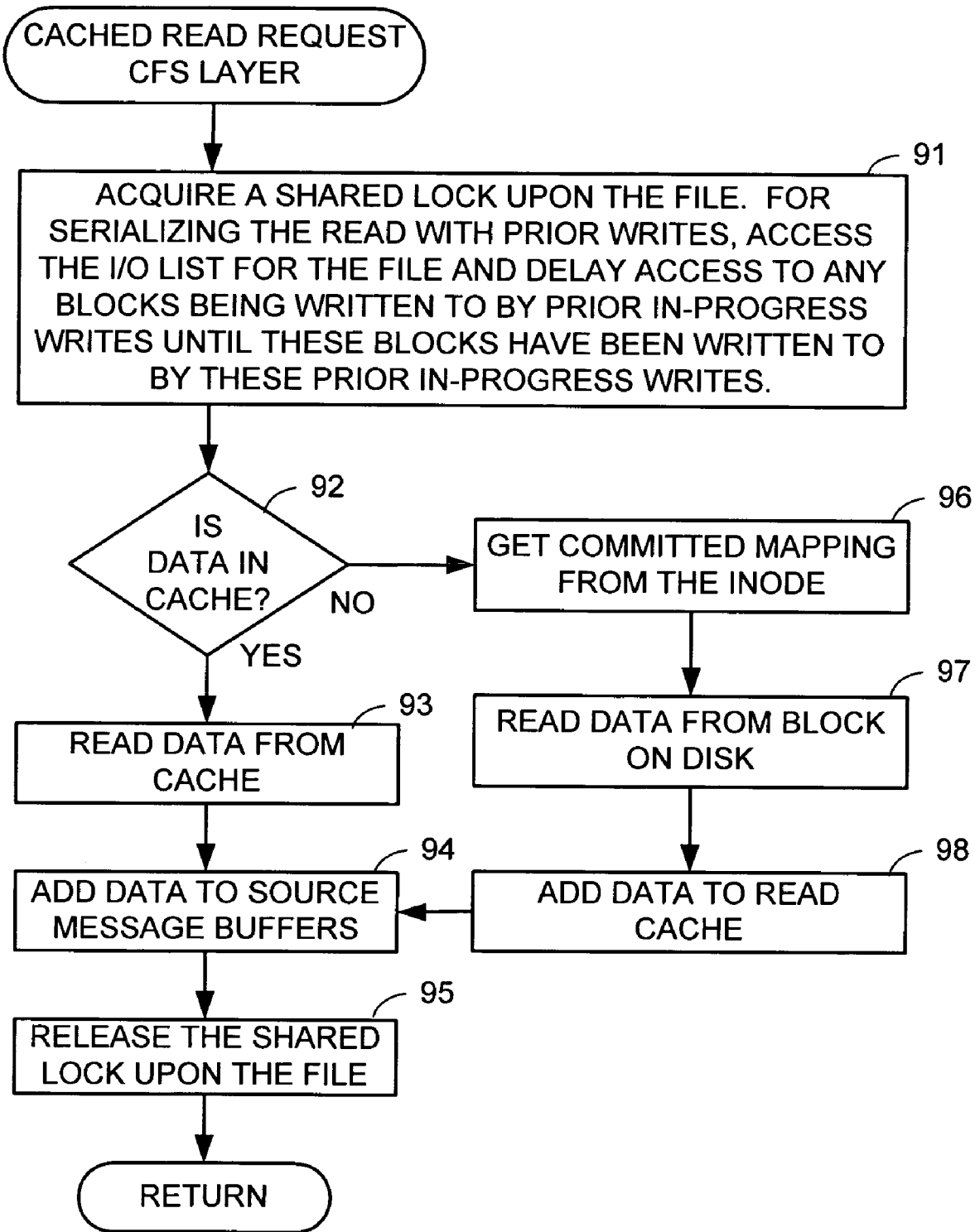
FIG. 9 is a flowchart of programming in the Common File System (CFS) layer in the network file server for handling a read request from a client.

FIG. 9 shows programming in the CFS layer in the network file server for handling a read request from a client concurrent with handling a write request to the same file. For clarity, FIG. 9 omits certain steps for handling read-write interactions. These steps are show in FIG. 10 and further described below.

In a first step 91 of FIG. 9, the CFS layer obtains a shared lock upon the file for the read request. In addition, for serializing the read with prior writes, the I/O list for the file (75 in FIG. 4) can be accessed, and read access (in steps 93 or 97) to any blocks being written to by prior in-progress writes is delayed until these blocks have been written to by these prior in-progress writes. In step 92, execution continues to step 93 if the data requested by the read request is found in the file system cache (51 in FIG. 2). In step 93, the data requested by the read request is read from the cache. In step 94, the data read from the cache is added to source message buffers (53 in FIG. 2). In step 95, the shared lock upon the file is released for the write request, and the handling of the read request by the CFS layer is done.

In step 92, in the requested data is not found in the cache, then execution branches to step 96. In step 96, the last committed version of the inode for the file is accessed to perform a search for the data block on disk containing the requested data. In step 97, the requested data is read from the data block on disk. In step 98, the data read from the data block on disk is added to the cache. After step 98, execution continues to step 94 to add the data to the source message buffers.

Figure 10:
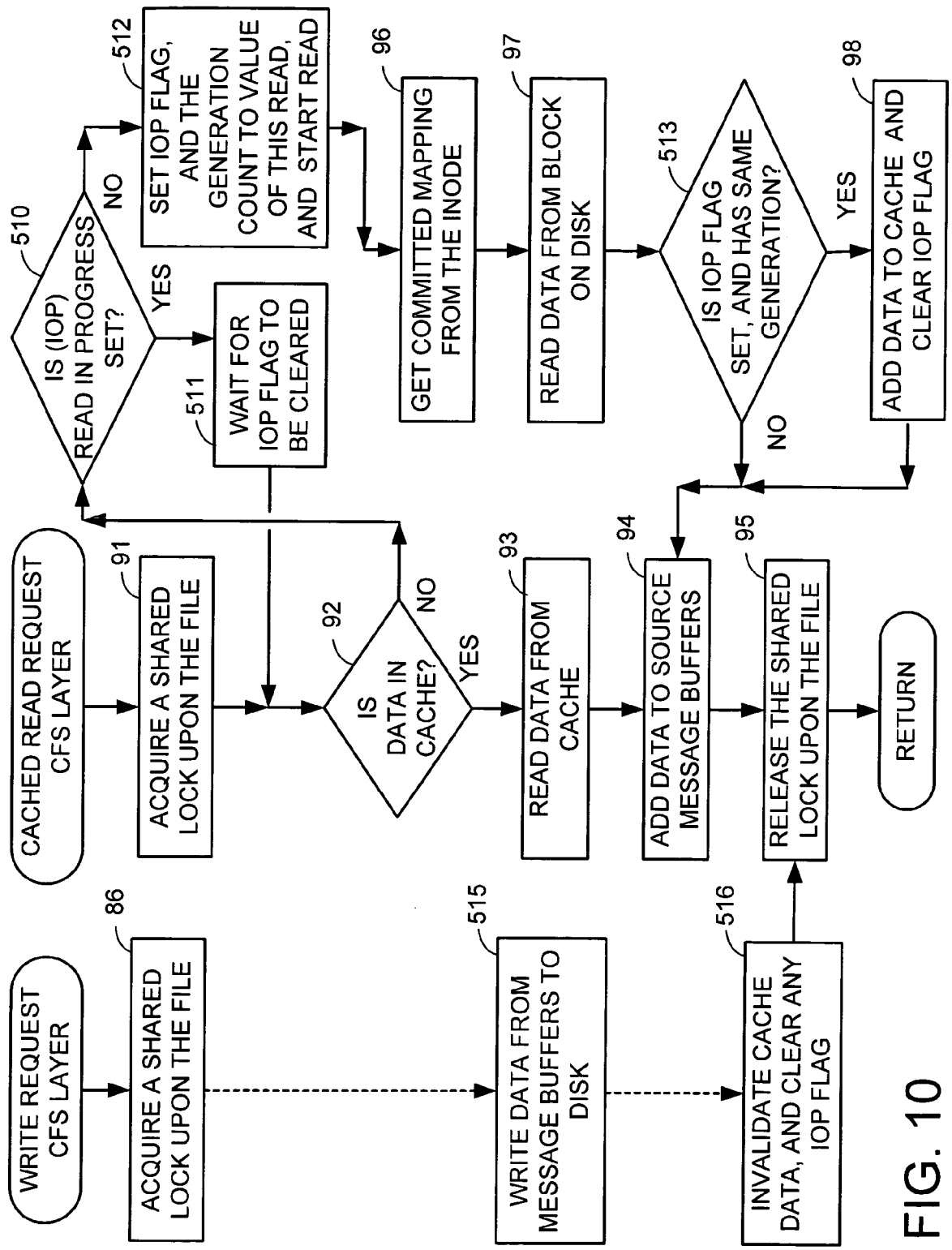
FIG. 10 is a flowchart of programming in the Common File System (CFS) layer in the network file server for handling concurrent read and write requests from a client.

FIG. 10 shows the behavior of the server when there are read-write interactions during concurrent access of multiple I/O threads to a single file. In particular, the steps in FIG. 10 occur when a read I/O request accesses blocks to which there is a concurrent ongoing write. Each read and write must obtain a shared lock upon the file. A read acquires the shared lock upon the file in step 91, and a write acquires the shared lock upon the file in step 86.

The file system cache (51 in FIG. 2) maintains an index or block map including, for each file system block, an I/O in progress (IOP) flag indicating whether or not a read to the file system block on disk is in progress. During a cached read, if the block map indicates that the block of data to be read is not found in the file system, then execution branches from step 92 to step 510. In step 510, if the IOP flag is set, then execution continues to step 511 to wait for the IOP flag to be cleared. Execution loops back from step 511 to step 92.

If in step 510 the IOP flag is not set, then execution branches to step 512 to set the IOP flag and to set a generation count for the block to a value of the present read of the block from disk, and to start the read of the disk. The read of the disk is performed in step 96 to get the committed mapping from the inode, and in step 97 to read data from the block on disk. Once the data from the disk is obtained, the IOP flag and the generation count are checked in step 513. If the IOP flag is set and the generation count is the same as it was in step 512 for the read operation, then in step 98 the data is added to the read cache. After step 98, execution continues to step 94.

It is possible that in step 513, the IOP flag will be cleared, or the generation count may be different. The IOP flag can be cleared by a concurrent write operation. For example, after a shared lock upon the file is obtained in step 86 for a concurrent write to the file, data is written in step 515 from message buffers to disk. After step 515, in step 516, any cache data for the data block is invalidated, and any IOP flag for the data block is cleared. After step 516, execution continues to step 95 to release the shared lock upon the file. It is possible for a concurrent read to this file block to begin just after the IOP flag for the block is cleared in step 516 but before a previous read has reached step 513. In this case, the previous read will find that the IOP flag is set in step 513 but the generation count will have changed, so that step 98 of adding the data to the cache will be skipped. Step 98 is skipped under these circumstances because the data is current for this previous read operation but stale for subsequent read operations.

In short, a write request is serviced by finding partial blocks and creating a partial block list, preallocating metadata blocks for the range of block numbers in the inode that is being written, issuing asynchronous write requests, waiting for completion of the asynchronous write requests, getting a block commit lock, committing the preallocated metadata blocks for the range written to in the inode, releasing the block commit lock, starting asynchronous writes for conflict I/Os, finding the range of blocks in the file system cache to be invalidated, invalidating the file system cache blocks for the block range being committed, if there are active readers, marking the cache range as stale data (for example, via the IOP flag and generation count mechanism shown in FIG. 10).

In short, a read request serviced by finding the range of file blocks to be read, and if the blocks are in cache, then reading the data from the cache, and if not, then getting the block commit lock, getting the committed mapping from the inode for the range of blocks to be read, releasing the block commit lock (i.e., the allocation mutex), reading data from disk to the buffer cache and source, and if there are stale blocks in the block range (because a write to the blocks occurred during the read), then invalidating the stale blocks.

During a read, IOP flags and generation counts can be used to identify stale blocks. For example, when looking up to see whether data to be read is in cache, missing blocks are marked as IOP (I0 in Progress) and the generation count is set to a value associated with this read, and then a read will be started. After completing any reads necessary the blocks that were previously marked as IOP are cleared in one of the following ways: (1) if the slot is cleared, then it's been purged and the just completed read should not be entered and cached; (2) if it's marked as IOP then the generation count is checked: if the generation count is the same as set for this read then data for this read is cached in the slot; otherwise, the data for this read is not cached in this slot but otherwise it can be used to satisfy the read request. During the read process, any concurrent writes are simply allowed to proceed. At the end of the write, the entire range of blocks written are invalidated in the cache. If a cache slot in the range is empty, then it is ignored; otherwise, if the slot had a hint then the slot is cleared, and if the slot was IOP then the IOP flag is cleared and any waiting reads (in step 511 of FIG. 10) are awoken and allowed to proceed.

Servicing of the concurrent read and write requests as described above prevents writes to a file from being blocked. There is, however, still an issue of concurrent reads and writes to the same blocks in the same file. For some applications, it is desirable to serialize these reads and writes in so that the data returned by a read operation will indicate that the writes are atomic operations. For example, if each of two write operations write to the same two blocks, a read should not return a first block from the first write operation and a second block from the second write operation. This problem can be solved by looking for conflicting blocks for prior in-progress reads and writes before issuing an asynchronous write operation and by looking for conflicting blocks for prior in-progress writes before issuing an asynchronous read operation, and if a conflict is found, waiting for these prior in-progress conflicting operations to complete before the asynchronous write operation or read operation is issued. This can be done by inspection of the block ranges for prior in-progress writes in the I/O list 75 in FIG. 4. For reads, this would be done in step 91 of FIG. 9. In addition, a read could immediately access non-conflicting blocks in the cache, without waiting for the prior-in-progress writes to complete.

Instead of using the I/O list to serialize reads and writes to the same file blocks, a "Write In Progress" (WIP) flag could be added to the file system cache block map. In effect, the WIP flag would be a write lock at the file block level of granularity. Before issuing an asynchronous write operation, during the preallocation stage (S1), the primary processor would set the WIP flags for the file system blocks being written to, unless a WIP flag would already be set, in which case, the write operation would need to wait for completion of the prior conflicting write. The WIP flags would be reset in the asynchronous write stage (S2) after writing to each block. Subsequent writes that encountered a set WIP flag within it's own block range would be required to wait before writing to each block. Likewise attempts to read that encounter a set WIP flag would need to wait until the WIP flag is reset by completion of the conflicting write. If a read operation is accessing blocks being written to by prior in-progress writes, then the read operation should not access these blocks until after they have been written to by the prior in-progress writes. For example, in step 91 of FIG. 9, the I/O list (75 in FIG. 4) or the WIP flags can be accessed to determine the conflicting blocks, before attempting to access these blocks in cache. However, the cache can be accessed immediately for blocks that are not being written to by prior, in-progress writes.

Figure 11:
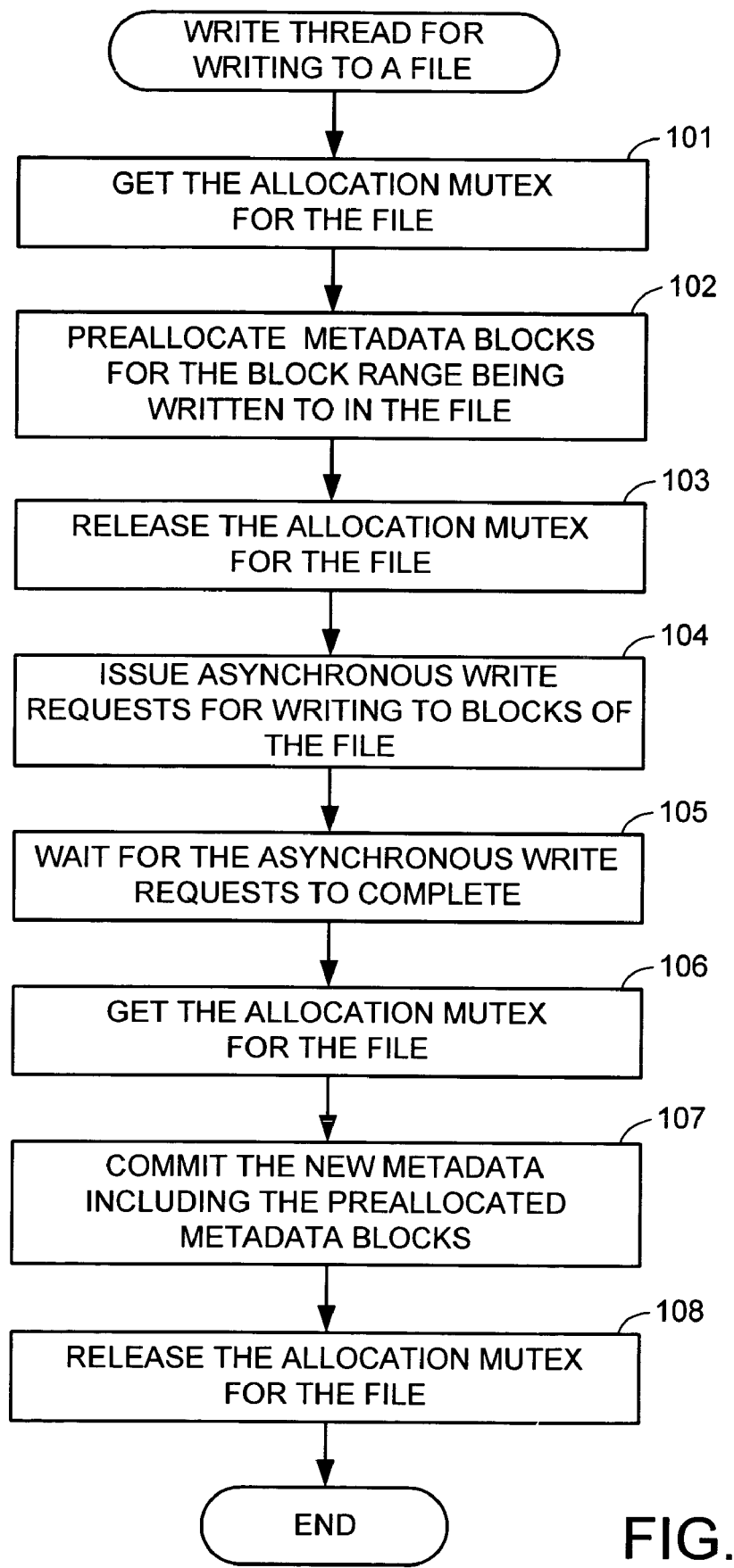
FIG. 11 is a flowchart of a write thread in the UxFS layer of the network file server.

FIG. 11 shows a flowchart of a write thread in the UxFS layer (44 in FIG. 2). In a first step 101, the write thread gets the allocation mutex (72 in FIG. 4) for the file. Then in step 102, the write thread preallocates metadata blocks for the block range being written to the file. In step 103, the write thread releases the allocation mutex for the file.

In step 104, the write thread issues asynchronous write requests for writing to blocks of the file. For example, a list of callbacks is created. There is one callback for each asynchronous write request consisting of up to 64 K bytes of data from one or more contiguous file system blocks. An I/O list is created for each callback. The asynchronous write requests are issued asynchronously, so multiple asynchronous writes may be in progress concurrently. In step 105, the write thread waits for the asynchronous write requests to complete.

In step 106, the write thread gets the allocation mutex for the file. In step 107, the write thread commits the preallocated metadata blocks to the file system in storage. The new metadata for the file including the preallocated metadata blocks is committed by being written to the log (55 in FIG. 3). File system metadata such as the file modification time, however, is not committed in step 107 and is not logged. Instead, file system metadata such as the file modification time is updated at a file system sync time during the flushing of file system inodes. Finally, in step 108, the write thread releases the allocation mutex for the file. This method of preallocating and committing metadata blocks does not need any locking or metadata transactions for re-writing to allocated blocks.

Figure 12:
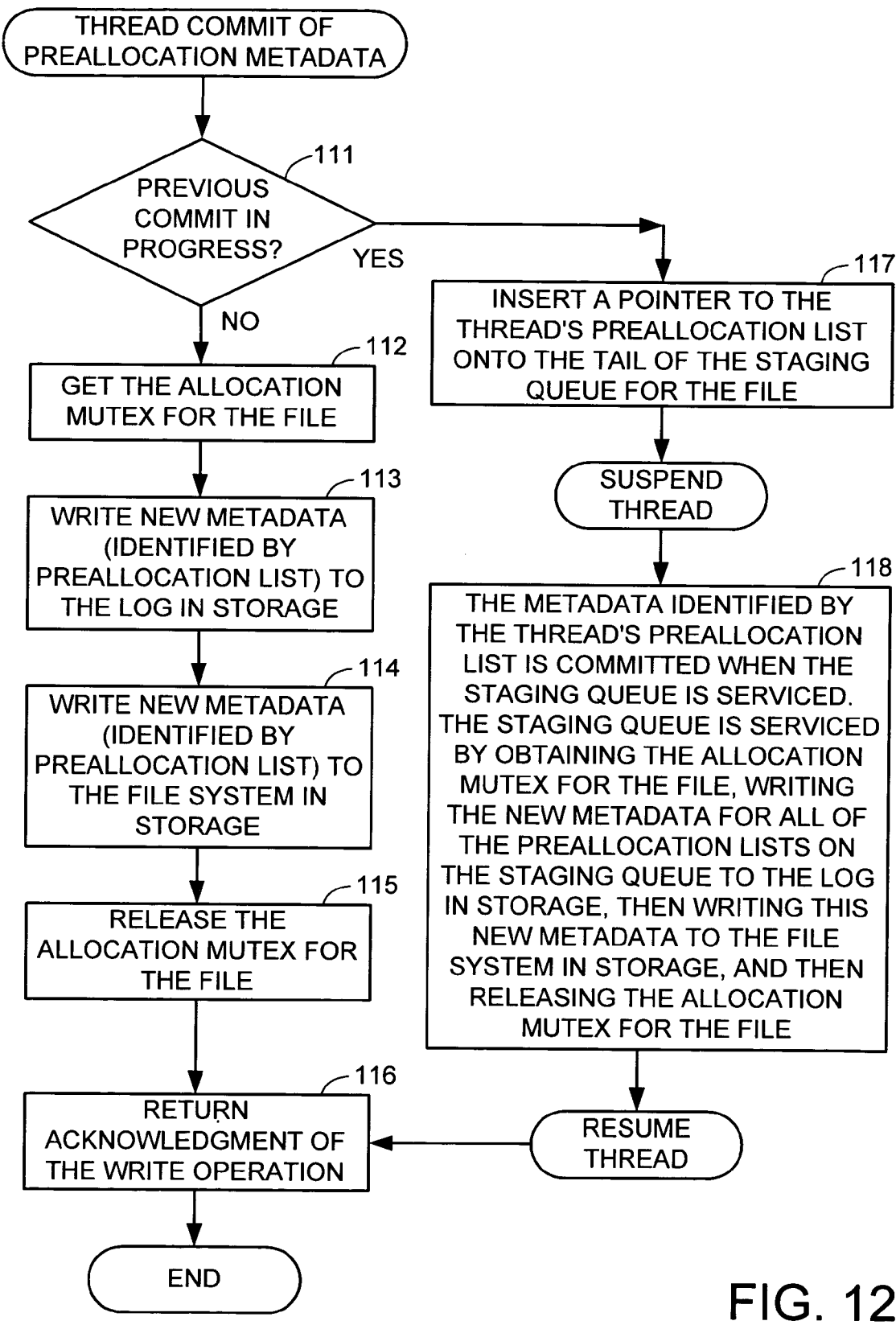
FIG. 12 is a more detailed flowchart of steps in the write thread for committing preallocated metadata.

FIG. 12 is a more detailed flowchart of steps in the write thread for committing the preallocated metadata. In a first step 111, if there is not a previous commit in progress, then execution continues to step 112. In step 112, the thread gets the allocation mutex for the file. Then in step 113, the thread writes new metadata (identified by the thread's preallocation list) to the log in storage. In step 114, the thread writes the new metadata (identified by the thread's preallocation list) to the file system in storage. In step 115, the thread releases the allocation mutex for the file. Finally, in step 116, the thread returns an acknowledgement of the write operation.

In step 111, if there was a previous commit in progress, then the thread inserts a pointer to the threads' preallocation list onto the tail of the staging queue for the file. If the staging queue was empty, then the staging queue is put on the wait list of staging queues (78 in FIG. 4). The thread is suspended, waiting for a callback from servicing of the staging queue. In step 118, the metadata identified by the thread's preallocation list is committed when the staging queue is serviced. The staging queue is serviced by obtaining the allocation mutex for the file, writing the new metadata for all of the preallocation lists on the staging queue to the log in storage, then writing this new metadata to the file system in storage, and then releasing the allocation mutex for the file. Once servicing of the staging queue has committed the new metadata for the thread's preallocation list, execution of the thread is resumed in step 116 to return an acknowledgement of the write operation. After step 116, the thread is finished with the write operation.

Figure 13:
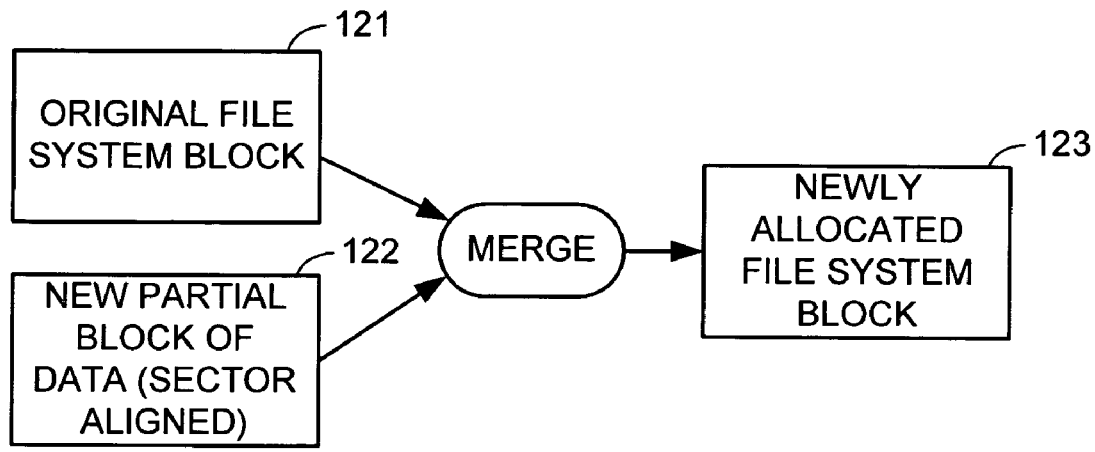
FIG. 13 is a block diagram of a partial block write during a copy-on-write operation.

FIG. 13 is a block diagram of a partial block write during a copy-on-write operation. Such an operation involves copying a portion of the data from an original file system block 121 to a newly allocated file system block 123, and writing a new partial block of data 122 to the newly allocated file system block. The portion of the data from the original file system block becomes merged with the new partial block of data 122. If the new partial block of data is sector aligned, then the partial block write can be performed by the uncached multithreaded write interface (63 in FIG. 3). Otherwise, if the new partial block of data were not sector aligned, then the partial block write would be performed by the cached read/write interface (61 in FIG. 3).

The copy-on-write operation may frequently occur in a file system including one or more read-only file snapshot copies of a read-write file. Such a file system is described in Chutani, Sailesh, et al., "The Episode File System," Carnegie Mellon University IT Center, Pittsburgh, Pa., June 1991, incorporated herein by reference. Each read-only snapshot copy is the state of the read-write file at a respective point in time. Read-only snapshot copies can be used for on-line data backup and data mining tasks.

Figure 15:
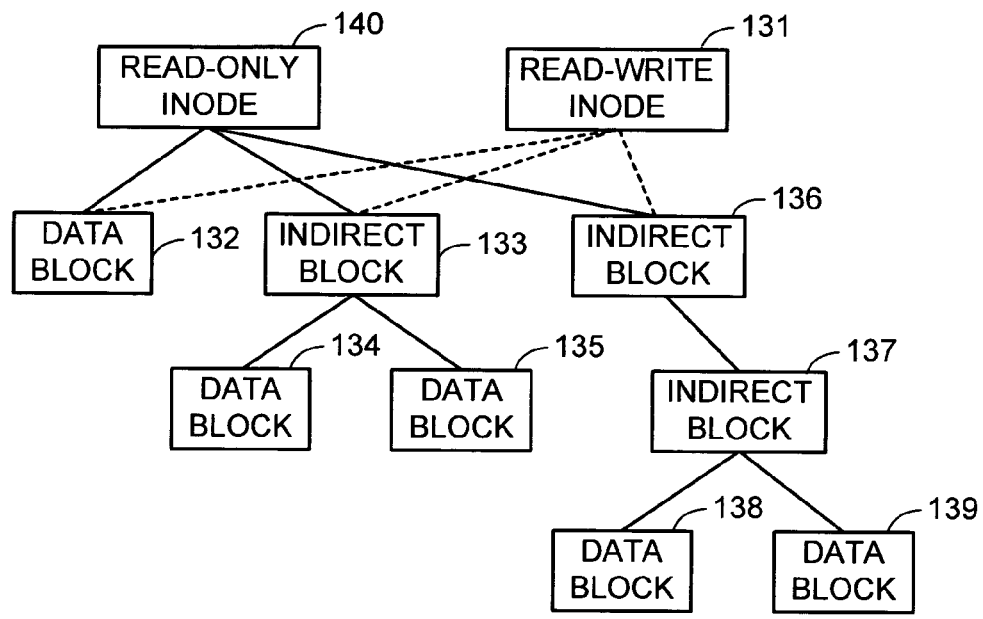
FIG. 15 is a block diagram of the read-write file of FIG. 14 after creation of a read-only snapshot copy of the read-write file.

In a copy-on-write file versioning method, the read-only snapshot copy initially includes only a copy of the inode of the original file. Therefore the read-only snapshot copy initially shares all of the data blocks as well as any indirect blocks of the original file. When the original file is modified, new blocks are allocated and linked to the original file inode to save the new data, and the original data blocks are retained and linked to the inode of the read-only snapshot copy. The result is that disk space is saved by only saving the difference between two consecutive snapshot copies. This process is shown in FIGS. 13, 14, and 15.

FIG. 14 shows a read-write file as maintained by the UxFS layer. The file has a hierarchical organization, depicted as an inverted tree. The file includes a read-write inode 131, a data block 132 and an indirect block 133 linked to the read-write inode, a data block 134 and an indirect block 135 linked to the indirect block 133, and data blocks 136 and 137 linked to the indirect block 135.

When a read-only snapshot copy of a read-write file is created, a new inode for the read-only snapshot copy is allocated. The read-write file inode and file handle remain the same. After allocation of the new inode, the read-write file is locked and the new inode is populated from the contents of the read-write file inode. Then the read-write file inode itself is modified, the transaction is committed, and the lock on the read-write file is released.

The allocation of blocks during the copy-on-write to the read-write file raises the possibility of the supply of free storage being used up after writing to a small fraction of the blocks of the read-write file. To eliminate this possibility, the read-write file can be provided with a "persistent reservation" mechanism so that the creation of a read-only snapshot copy will fail unless there can be reserved a number of free storage blocks equal to the number of blocks that become shared between the read-only snapshot copy and the read-write file. The number of reserved blocks can be maintained as an attribute of the file. The number of reserved blocks for a read-only file can be incremented as blocks become shared with a read-only snapshot copy, and decremented as blocks are allocated during the writes to the read-write file.

FIG. 15 shows the read-write file of FIG. 14 after creation of a read-only snapshot copy of the read-write file. The read-only inode 138 is a copy of the read-write inode 131. The read-write inode 131 has been modified to indicate that the data block 132 and the indirect block 133 are shared with a read-only snapshot copy. For example, in the read-write inode 131, the most significant bit in each of the pointers to data block 132 and the indirect block 133 have been set to indicate that the pointers point to blocks that are shared with the read-write file. (The links represented by such pointers to shared blocks are indicated by dotted lines in FIGS. 15 and 16.) Also, by inheritance, any and all of the descendants of a shared block are also shared blocks. Routines in the UxFS layer that use the pointers to locate the pointed-to file system blocks simply mask out the most significant to determine the block addresses.

In general, for the case in which there are multiple versions of a file sharing file blocks, when a file block is shared, it is desirable to designate the oldest snapshot copy sharing the block to be the owner of the block, and any other files to be non-owners of the block. A pointer in a non-shared block pointing to a shared block will have its most significant bit set if the block is not owned by the owner of the non-shared block, and will have its most significant bit clear if the block is owned by the owner of the non-shared block.

When writing to a specified sector of a file, a search of the file block hierarchy is done starting with the read-write inode, in order to find the file block containing the specified sector. Upon finding a pointer indicating that the pointed-to block is shared, the pointed-to block and its descendants are noted as "copy on write" blocks. If the specified sector is found in a "copy on write" block, then a new file block is allocated.

In practice, multiple write threads are executed concurrently, so that more than one concurrent write thread could determine a need to preallocate the same new file block. The allocation mutex is used to serialize the allocation process so more than one preallocation of a new file block does not occur. For example, once the write thread has obtained the allocation mutex, the write thread then determines whether a new block is needed, and if so, then the write thread preallocates the new block. The write thread may obtain the allocation mutex, allocate multiple new blocks in this fashion, and then release the allocation mutex. For example, to write to a data block of a file, when the write thread finds a shared block on the path in the file hierarchy down to the data block of the file, the write thread obtains the allocation mutex, and then allocates all the shared blocks that it then finds down the path in the file hierarchy down to and including the data block, and then release the allocation mutex.

Once a new file block has been allocated, a partial block write to the new file block is performed, unless the write operation writes new data to the entire block. The new file block is the same type (direct or indirect) as the original "copy on write" file block containing the specified sector. If the write operation writes new data to the entire new file block, then no copy need be done and the new data is simply written into the newly allocated block. (A partial write could be performed when the write operation writes new data to the entire block, although this would not provide the best performance.)

If the read-write inode or a block owned by the read-write file was a parent of the original "copy on write" block, then the new file block becomes a child of the read-write inode or the block owned by the read-write file. Otherwise, the new file block becomes the child of a newly allocated indirect block. In particular, copies are made of all of the "copy on write" indirect blocks that are descendants of the read-write inode and are also predecessors of the original "copy on write" file block.

Figure 16:
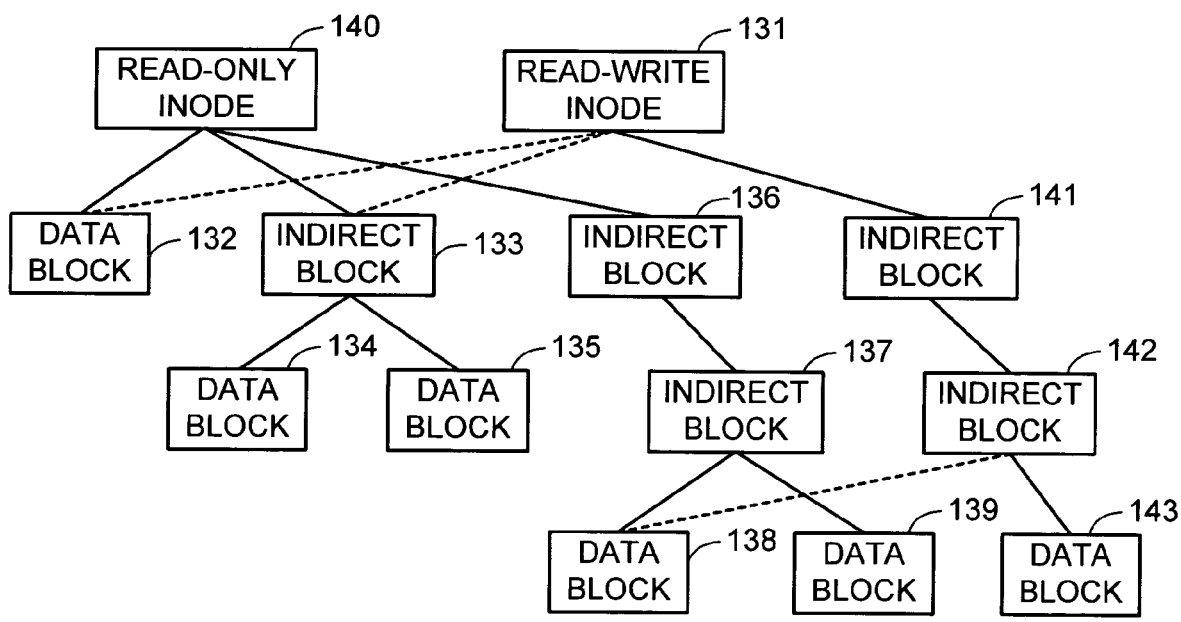
FIG. 16 is a block diagram of the read-write file of FIG. 15 after a copy-on-write operation upon a data block and two indirect blocks between the data block and the inode of the read-write file.

For example, assume that a write request specifies a sector found to be in the data block 137 of FIG. 15. Upon searching down the hierarchy from the read-write inode 131, it is noted that indirect blocks 133 and 135 and the data block 137 are "copy on write" blocks. As shown in FIG. 16, new indirect blocks 139 and 140 and a new data block 141 have been allocated. The new data block 141 is a copy of the original data block 136 except that it includes the new data of the write operation. The new indirect block 140 is a copy of the original indirect block 135 except it has a new pointer pointing to the new data block 141 instead of the original data block 137. The new indirect block 139 is a copy of the original indirect block 133 except it has a new pointer pointing to the new indirect block 140 instead of the original indirect block 135. Also, the read-write inode 131 has been modified to replace the pointer to the original indirect block 133 with a pointer to the new indirect block 139.

In some instances, a write to the read-write file will require the allocation of a new data block without any copying from an original data block. This occurs when there is a full block write, a partial block write to a hole in the file, or a partial block write to an extended portion of a file. When there is a partial block write to a hole in the file or a partial block write to the extended portion of a file, the partial block of new data is written to the newly allocated data block, and the remaining portion of the newly allocated data block is filled in with zero data.

It is possible that the UxFS layer will receive multiple concurrent writes that all require new data to be written to the same newly allocated block. These multiple concurrent writes need to be synchronized so that only one new block will be allocated and the later one of the threads will not read old data from the original block and copy the old data onto the new data from an earlier one of the threads. The UxFS layer detects the first such write request and puts a corresponding entry into the partial block conflict queue (73 in FIG. 4). The UxFS layer detects the second such write request, determines that it is conflicting upon inspection of the partial block conflict queue, places an entry to the second such write request in the partial write wait queue (74 in FIG. 4), and suspends the write thread for the second such write request until the conflict is resolved.

Figure 17:
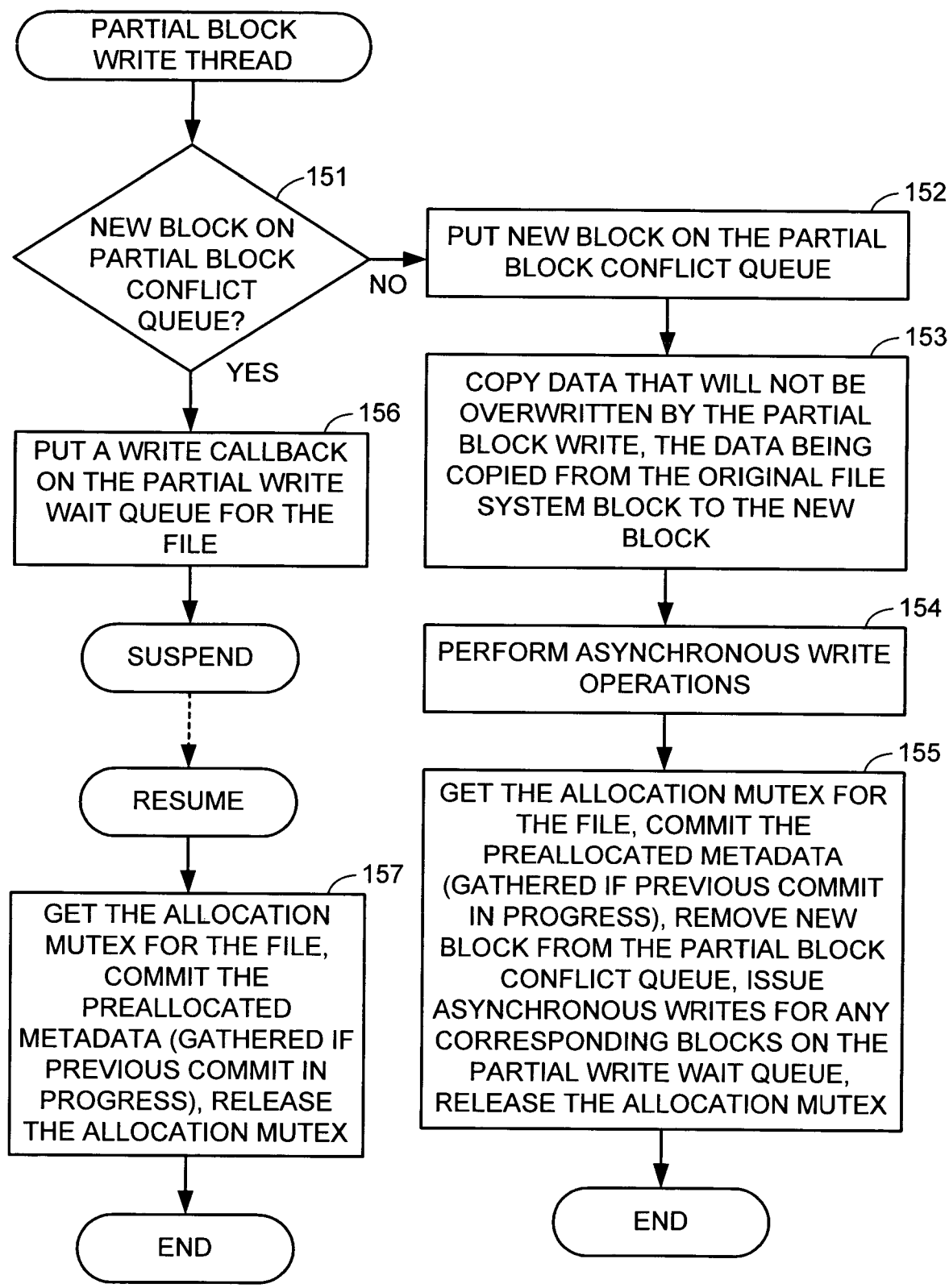
FIG. 17 is a flowchart of steps in a write thread for performing the partial block write operation of FIG. 13.

FIG. 17 is a flowchart of steps in a write thread for performing the partial block write operation of FIG. 13. In a first step 151 of FIG. 17, if the newly allocated file system block (124 in FIG. 13) is not on the partial block conflict queue (73 in FIG. 4), then execution branches to step 152. In step 152, the partial block write thread puts the new block on the partial block conflict queue. In step 153, the partial block write thread copies data that will not be overwritten by the partial block write, the data being copied from the original file system block to the new file system block. In step 154, asynchronous write operations are performed to write the new partial block of data to the new block. In step 155, the partial block write thread gets the allocation mutex for the file, commits the preallocated metadata (or the preallocated metadata is gathered and committed upon servicing of the staging queue if a previous commit is in progress), removes the new block from the partial block conflict queue, issues asynchronous writes for any corresponding blocks on the partial write wait queue, and releases the allocation mutex.

In step 151, if the newly allocated file system block was on the partial block conflict queue, then execution continues to step 156. In step 156, the partial block write thread puts a write callback on the partial write wait queue for the file. Then execution is suspended until the callback occurs (from the completion of the asynchronous writes issued in step 155). Upon resuming, in step 157, the partial block write thread gets the allocation mutex for the file, commits the preallocated metadata (or the preallocated metadata is gathered and committed upon servicing of the staging queue if a previous commit is in progress), and releases the allocation mutex.

Figure 18:
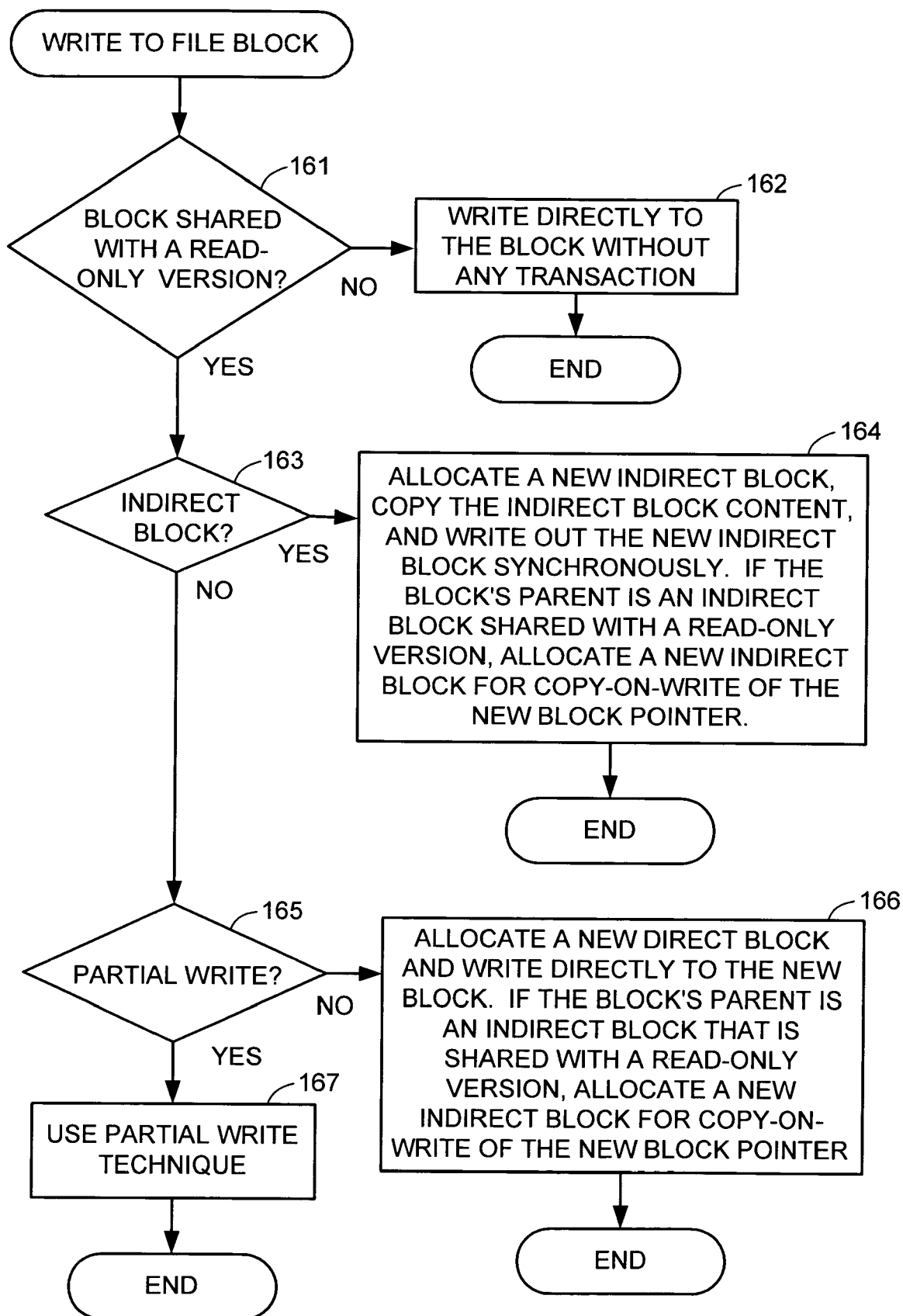
FIG. 18 shows a flowchart of steps in a write thread for allocating file blocks when writing to a file having read-only snapshots.

FIG. 18 shows steps in a write thread for allocating file blocks when writing to a file having read-only versions. In a first step 161, if the file block being written to is not shared with a read-only version, then execution branches to step 162 to write directly to the block without any transaction. In other words, there is no need for allocating any additional blocks.

In step 161, if the file block being written to is shared with a read-only version, then execution continues to step 163. In step 163, if the file block being written to is an indirect block, then execution branches to step 164. In step 164, a new indirect block is allocated, the original indirect block content is copied to the new indirect block, and the new metadata is written to the new indirect block synchronously. If the block's parent is an indirect block shared with a read-only version, then a new indirect block is allocated for copy-on-write of the new block pointer. Any other valid block pointers in this new indirect block point to shared blocks, and therefore the most significant bit in each of these other valid block pointers should be set (as indicated by the dotted line between the indirect blocks 136 and 140 in FIG. 16). For example, just after the original indirect block content is copied to the new indirect block, the most significant bit is set in all valid block pointers in the new indirect block. As described above with respect to FIG. 16, this copy-on-write may require one or more additional indirect blocks to be allocated (such as indirect block 139 in FIG. 16). For example, the tree of a UxFS file may include up to three levels of indirect blocks. All of the file blocks that need to be allocated can be predetermined so that the allocation mutex for the file can be obtained, all of the new blocks that are needed can be allocated together, and then the allocation mutex for the file can be released.

In step 163, if the file block being written to is not an indirect block, then execution continues to step 165. This is the case in which the file block being written to is a data block.

In step 165, if the write to the file block is not a partial write, then execution branches to step 166. In step 166, a new data block is allocated and the block of new data is written directly to the new data block. If the original block's parent is an indirect block that is shared with a read-only version, then a new indirect block is allocated for copy-on-write of the new block pointer. As described above with respect to FIG. 16, this copy-on-write may require one or more additional indirect blocks to be allocated.

In step 167, for the case of a partial write, execution continues from step 156 to step 167 to use the partial write technique as described above with respect to FIG. 13 and FIG. 17.

Various parts of the programming for handling a write thread the UxFS layer have been described above with reference to FIGS. 11 to 18. Following is a listing of the steps in the preferred implementation of this programming.

1. The write thread receives a write request specifying the source and destination of the data to be written. The source is specified in terms of message buffers and the message buffer header size. The destination is specified in terms of an offset and number of bytes to be written.
2. The write thread calculates the starting and ending logical block number, total block count, and determines whether the starting and ending blocks are partial blocks.
3. The write thread gets the allocation mutex for the file.
4. The write thread searches the file tree along a path from the file inode to the destination file blocks to determine whether there are any shared blocks along this path. For each such shared block, a new data or indirect block is allocated synchronously, as described above with reference to FIGS. 15, 16, and 18.
5. The write thread identifies partial blocks of write data using the starting physical block number and the number of blocks to be written. Only the starting and ending block to be written can be partial. Also, if some other thread got to these blocks first, the block mapping may already exist and the "copy-on-write" will be done by the prior thread. The partial block conflict queue is checked to determine whether such an allocation and "copy-on-write" is being done by a prior thread. If so, the block write of the present thread is added to the partial write wait queue, as described above with reference to FIG. 17.
6. The write thread preallocates the metadata blocks.
7. The write thread releases the allocation mutex.
8. The write threads determine the state of the block write. The block write can be in one of three states, namely:
   1. Partial, in-progress writes. These are writes to blocks that are on the conflict list. This write is deferred. The information to write out these blocks is added to the partial write wait queue.
   2. Whole Block Writes.
   3. Partial, not-in-progress writes. These are partial writes to newly allocated blocks, and are the first write to these blocks.
9. The I/O list is split apart if there are any non-contiguous areas to be written.
10. Asynchronous write requests are issued for blocks in state 2 (full block writes).
11. Synchronous read requests are issued for blocks in state 3 (Partial not-in-progress writes).
12. Asynchronous write requests are issued for blocks in state 3.
13. The write thread waits for all writes to complete, including the ones in state 1. The write thread waits for all asynchronous write callbacks. The asynchronous writes for blocks in state 1 are actually issued by other threads.

14. The write thread gets the allocation mutex.

15. The write thread commits the preallocated metadata. The allocation lists being committed are gathered together if a previous commit is in progress, and are written out under the same logging lock as described above with reference to FIG. 12.

16. The write thread removes any blocks that the write thread had added to partial block conflict queue, and issues asynchronous writes for corresponding blocks on the partial write wait queue.

17. The write thread releases the allocation mutex. The write thread has completed the write operation.

III. Maintenance of a File Version Set Including Read-only and Read-write Snapshot Copies of a Production File.

As described above with reference to FIGS. 14 to 16 and 18, it is possible to use a copy-on-write technique for creating a read-only snapshot of a Unix-based file. The read-only snapshot can be used for non-disruptive backup by copying the read-only snapshot to a backup media such as magnetic tape or optical disk. In this case the backup is non-disruptive because the backup can be done as a background process while the original read-write file can be accessed on a priority basis. Once a backup copy of the read-only snapshot has been made, then the read-only snapshot can be deleted. For example, the read-only snapshot is deleted by relinquishing the ownership of all of its shared blocks back to the original read-write file, and then de-allocating all of the file system blocks that are exclusively owned by the read-only snapshot.

Instead of using a single read-only snapshot for making a backup copy of a file, it is possible to keep a series of read-only snapshots in the network file server. In this case, when a crash occurs and the most recent snapshot is found to be corrupted, then an older snapshot is immediately available for use in restoring the read-write file. Moreover, once an entire copy of an initial snapshot has been migrated to the backup storage, only the changes between the snapshots need be written to the backup storage in order to fully recover all of the snapshots. In this case, there is a savings in backup processing time and in backup storage capacity because more than one backup copy of each file system block will neither be transmitted to the backup storage device nor stored in the backup storage.

It is also desirable to provide a non-disruptive and virtually instantaneous mechanism for making a read-write snapshot. For example, during the recovery process, it is often desirable to create a temporary read-write copy of a read-only snapshot prior to restoring the original read-write file after a system crash. Recovery can be attempted upon the temporary read-write file, and then application programs can be tested upon the temporary read-write copy. If a recovery program or an application program should crash when using the temporary read-write copy, then the temporary read-write copy can be deleted, and the recovery process can be restarted using another temporary read-write copy of another read-only snapshot.

In order to facilitate the use of multiple read-only and read-write snapshot copies, it is desirable to define a file version set including read-only and read-write snapshot copies produced from an original read-write file. The original read-write file will be referred to as the production file. The read-only snapshot copies will be referred to as read-only versions, or simply versions. The read-write snapshot copies will be referred to as branch files.

Figure 19:
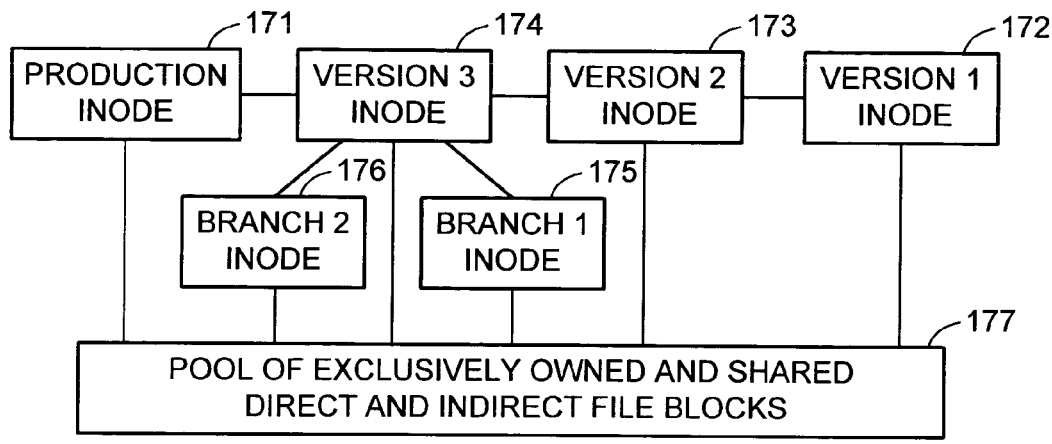
FIG. 19 is a block diagram of a file version set including read-only and read-write snapshot copies of a production file.

Shown in FIG. 19 is a preferred logical organization of such a file version set. The file version set includes a production inode 171 for the production file, version inodes 172, 173, 174 for a series of three read-only snapshots of the production file, and two branch inodes 175, 176 for respective read-write copies of the most recent read-only snapshot copy of the production file. The version set also includes a pool 177 of exclusively owned and shared data blocks and indirect file blocks. Each data block or indirect block in the pool 177 is linked to one or more of the inodes 171-176 either directly or indirectly through an indirect block in the pool 177. As will be described below with reference to FIGS. 21 to 23, the inodes 171 to 174 in the version set have a modified format so that the inodes can be linked together via certain inode attributes.

Initially, the production file can contain a raw volume of allocated file blocks, or the production file can be a sparse file that has no allocated blocks at creation time. For the case of a sparse file, the initial read-only versions of the production file will be sparse as well. As data is written to a sparse production file, the size of the file can grow up to a pre-specified maximum number of blocks, and the maximum block size can then be extended by moving the end-of-file (eof).

Figure 20:
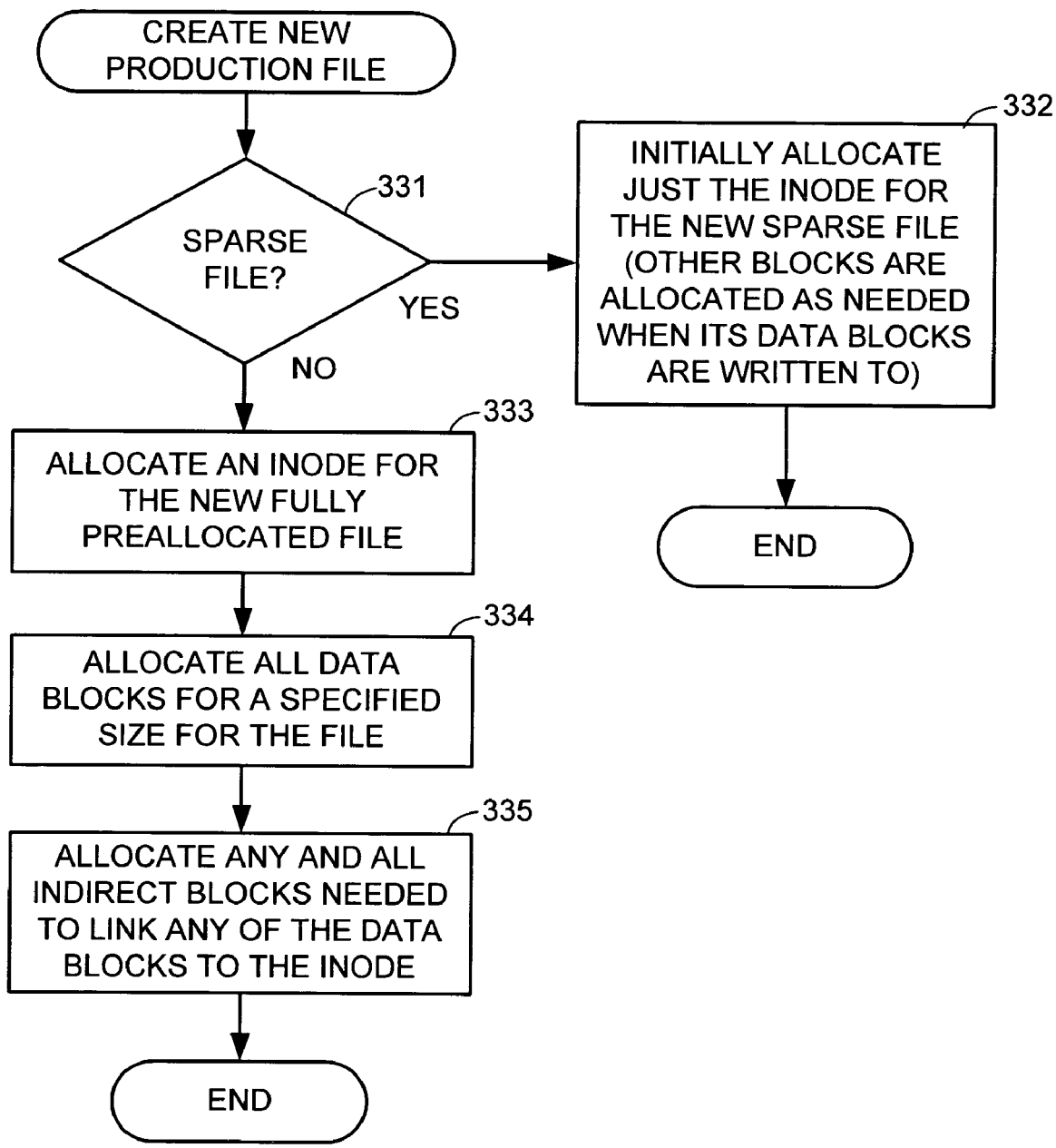
FIG. 20 is a flowchart of a procedure for creating a new production file.

As shown in FIG. 20, a new production file is created as either a sparse file or a fully preallocated file. For the case of a sparse file, execution branches from step 331 to step 332 to initially allocate just the inode for the new sparse file. Otherwise, execution continues from step 331 to step 333 to allocate an inode for the new fully preallocated file. Then in step 334, all of the data blocks are allocated for a specified size for the new fully preallocated file. Finally, in step 335, any and all indirect blocks are allocated for the new fully preallocated file as needed to link any of the data blocks of the fully preallocated file to the inode of the fully preallocated file. In other words, a fully preallocated file is created with all of its metadata allocated, including all of its indirect blocks and the data block pointers.

By initially allocating all of the metadata for a production file, the overhead associated with the allocations, such as synchronization with concurrent allocations, is eliminated for subsequent writes to the production file. A fully allocated production file provides similar behavior as a storage volume, where all the data blocks are present at the time of creation. A fully allocated production file, for example, is useful as a container for storage objects that are known to be dense, such as video files or copies of raw disk.

The initial working file can also be created sparse by writing only to the inode and last block of the file. The sparse file allows the production file to use only those blocks that the client writes data to. This allows less disk blocks to be consumed initially. The sparse file can then be used as the production file for the file version set. Since the new production file after creating a snapshot copy uses new data blocks to write out the data, it results in efficient data block usage, eliminating the need to allocate data blocks that may never be used. The data block allocation scheme can allocate blocks for the new working file in a way that can provide contiguity with the allocated blocks on the previous snapshot copy allowing sequential access to the data blocks for better read performance.

For management of the version set of FIG. 19, there is provided a protocol of operations upon the version set. These operations include file creation, file deletion, refresh, and recovery. File creation involves the creation of a read-only snapshot copy from the production file or from a branch file, or the creation of a branch file off a read-only version. File deletion involves the deletion of a read-only snapshot copy or a branch file. Refresh involves discarding the contents of an existing read-only snapshot copy and creating a new snapshot copy using the same name. Restore involves discarding the contents of the production file and creating a new production file using the contents of a specified read-only version.

Figure 21:
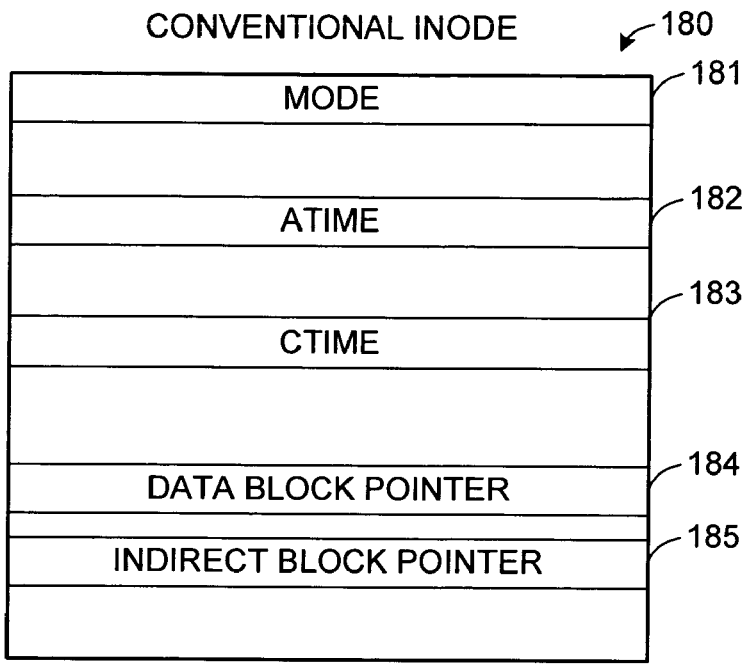
FIG. 21 is a block diagram of a conventional inode of a file.

FIG. 21 shows some of the fields of a conventional inode 180. The inode 180 includes a mode attribute (MODE) field 181, an access time attribute (ATIME) field 182, an inode change time attribute (CTIME) field 183, one or more data block pointer fields 184, and one or more indirect block pointer fields 185.

Figure 22:
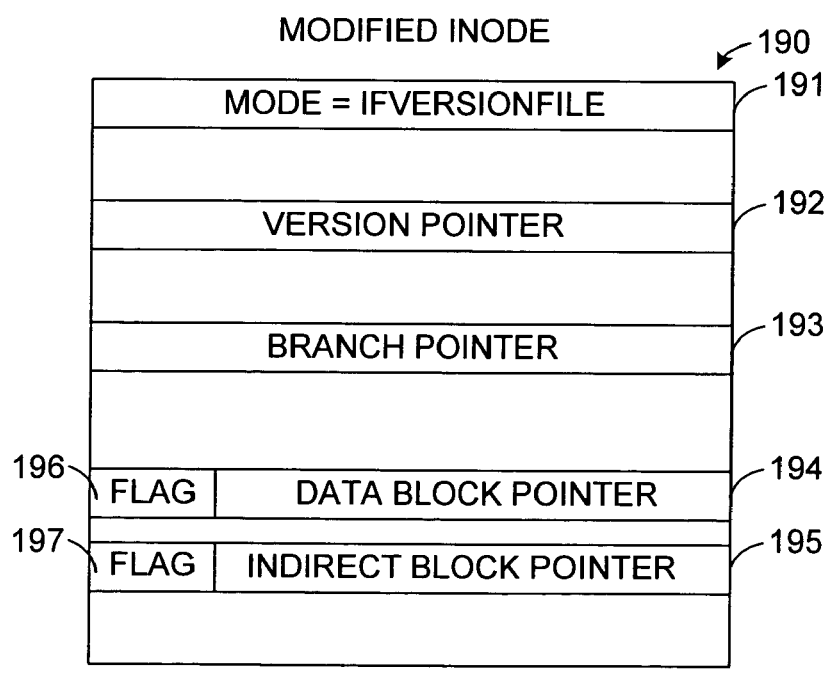
FIG. 22 is a block diagram of an inode in the file version set of FIG. 19.

FIG. 22 is a block diagram of an inode 190 in the file version set of FIG. 19. The mode attribute 191 is set with a value IFVERSIONFILE indicating that the inode 190 is for a file version set and the inode has a modified format, as further shown in FIG. 22. The ATIME field 192 in the modified inode 190 stores a version pointer instead of an access time. The CTIME field 193 in the modified inode 190 stores a branch pointer instead of an inode change time. In addition to a data block pointer, the data block pointer field 194 stores a non-owner flag 196 in the most significant bit position. The non-owner flag 196 has a value of zero to indicate that the file is an owner of the data block, and has a value of one to indicate that the file is a non-owner of the data block. In addition to an indirect block pointer, the indirect block pointer field 195 stores a non-owner flag 197 in the most significant bit position. The non-owner flag 197 has a value of zero to indicate that the file is an owner of the indirect block, and has a value of one to indicate that the file is a non-owner of the indirect block.

When there is only a production file, with no read-only snapshot copies, the production file owns all of its blocks. When the first read-only snapshot copy file is created, all of the blocks are passed to the new snapshot copy file and it becomes the owner of all of the blocks. The production file still uses the same blocks and the same blocks have identical contents (at least initially); however, it has become a non-owner of those blocks. If any block of the production file is modified, then a new version of that block is allocated and the production file will own that new block. (The new version of the block will be a different block of storage mapped to the same logical address in the file as the original version of the block.) As more snapshot files are created, different snapshot files may own different versions of a block. The owner of any particular block will always be the oldest snapshot copy that uses an identical version of a block, and the oldest snapshot copy will always own all of its blocks. When a sparse file is used, each time a new block is written to it will use the same UxFS allocation mechanism regardless of who owns the data block, the production file or one of the snapshot copies.

The concept of a non-owner block is further extended, for indirect blocks, to include the idea of a hierarchy of blocks. For indirect blocks and indirect block trees, if the non-owner flag is set at any level of the tree, then the non-owner state is assumed for all lower-level block pointers. For example, if a pointer to the first level indirect block is marked as non-owner, then all of the data blocks that it points to are assumed to be non-owner, regardless of the state of the non-owner flag in each of the individual block pointer fields.

Figure 23:
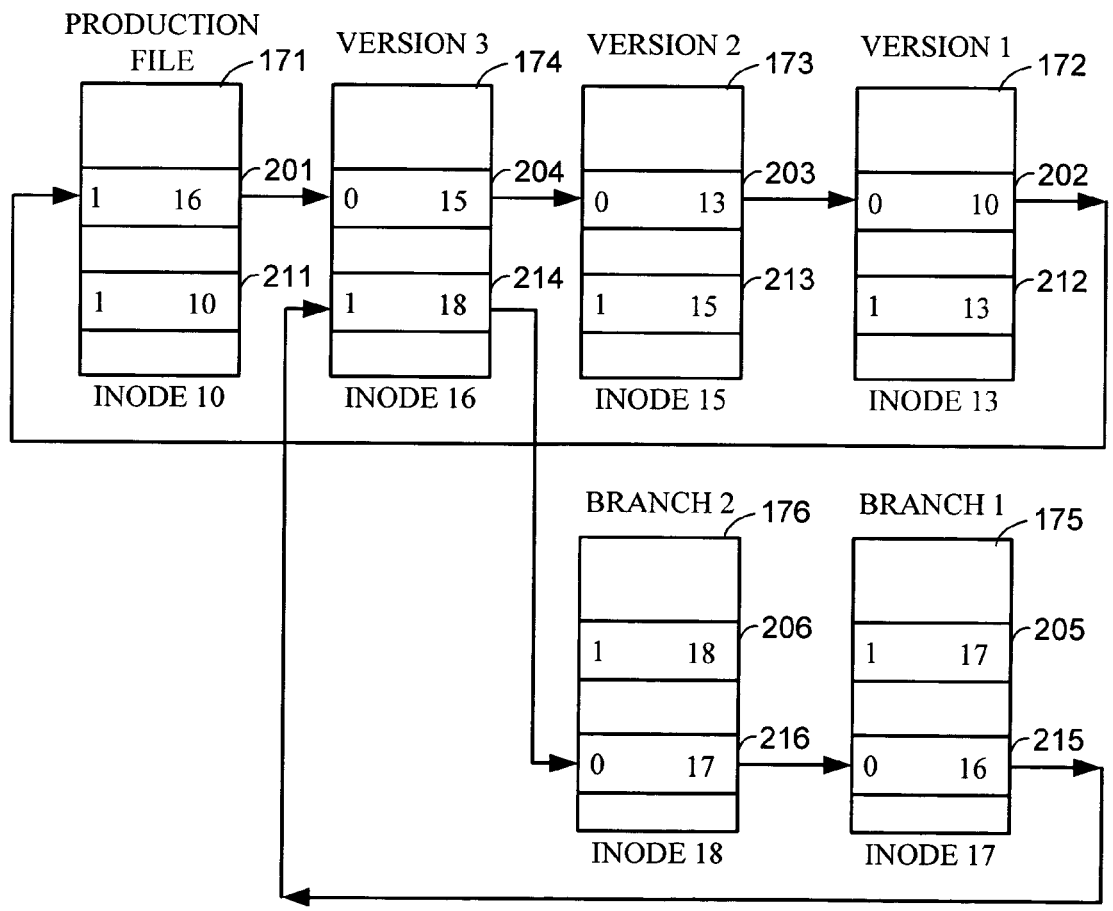
FIG. 23 is a block diagram showing linkages between the inodes in the file version set of FIG. 19.

FIG. 23 further shows the use of the version pointers and the branch pointers for linking the inodes 171-176 of the file version set introduced in FIG. 19. FIG. 23 shows that the version pointers are used to form a linked list linking the production file inode 171 to all of the version inodes 172, 173, 174. Single links are used in the linked list to conserve space within the conventional inode structure. The versions are linked from most recent to least recent so that a new version inode can be created without modifying other version inodes. The version pointer 201 of the production file 171 includes a most significant bit that is set to indicate that the inode 171 is the inode of the production file. The less significant bits of the version pointer 201 of the production file inode 171 contain the inode number of the most recent version if there is any read-only snapshot copy in the version set, and if not, the inode number of the production file inode.

For example, in FIG. 23, the version pointer 201 of the production file inode 171 includes the inode number 16 of the third read-only snapshot copy inode 174. Each inode 172, 173, 174 of a read-only snapshot copy has a version pointer having a most significant bit that is zero and an inode number of the inode of the next most recent read-only version, or in the case of the oldest read-only version, the inode number of the inode 171 for the production file. The version pointer 204 of the inode 174 of the third version contains the inode number 15 of the inode 173 of the second version. The version pointer 203 of the inode 174 of the second version contains the inode number 13 of the inode 172 of the first version. The version pointer 202 of the inode 172 of the first version contains the inode number 10 of the production file inode 171.

The branch pointer in each inode has a most significant bit to that is set to indicate 23 the production file inode or a read-only version inode, and that is zero to indicate a branch inode. The less significant bits of the branch pointer contain an inode number. For the production file inode 171 or a read-only version inode 172, 173, 174, if the less significant bits of the branch pointer contain the inode number of the inode, then there are no branch files based on the production file or read-only snapshot copy file, respectively. Otherwise, the less significant bits of the branch pointer in the production inode 171 or version inode 172, 173, 174 include the inode number of the inode of the most recent branch file based on the production file or read-only snapshot copy file, respectively. The less significant bits of the branch pointer in a branch inode contain the inode number of the next most recent branch file based on the same production file or read-only snapshot copy file, or for the oldest branch inode, the inode number of the base production or read-only snapshot copy file. In other words, if there are more than one branch file based on the production file or a read-only version, then the branch pointers are used to form a linked list of branch inodes off the base inode.

For example, in FIG. 23, the branch pointer 211 of the production file 171 contains the inode number 10 of the production file inode, since there are no branch files based directly on the production file. The branch pointer 212 of the first version inode 172 contains the inode number 13 of the first version inode, since there are no branch files based directly on the first read-only version. The branch pointer 213 of the second version inode 173 contains the inode number 15 of the second version inode, since there are no branch files based directly on the second read-only version. The branch pointer 214 of the third version inode 174 contains the inode number 18 of the second branch inode 176. The branch pointer 216 of the second branch inode 176 contains the inode number 17 of the first branch inode 175. The branch pointer 215 of the first branch inode 175 contains the inode number 16 of the third version inode 174.

In practice, it is desirable to prevent a user from creating a branch directly off the production file, since otherwise it would not be possible to recover the branch file after a disruption. The user can always create a read-write copy of the production file by first creating a read-only snapshot copy of the production file and then creating a branch based on the read-only version. If the branch file would be disrupted, then it could be recovered from the read-only version.

Because the production file inode serves as an anchor for the snapshot chain, it is desirable to prevent deletion of the production file if there are any snapshot files. The snapshot files should be deleted first.

It is also desirable to prevent a read-only snapshot copy from being deleted if there are any branch files based on the read-only version. Typically, any branch files based on the read-only file would be deleted first. Instead of deleting a branch file, it could be converted to a production file and unlinked from the base version, before deletion of the base version. The branch file could be converted to a production file by a background process of copying all blocks that are not owned by the branch file from the base version to newly allocated blocks for the branch file. In the copying process, all of non-owner flags would be cleared.

In addition, it is possible to write some changes to a branch file and then create a read-only snapshot copy of the branch file. In this case, the version pointer in the branch inode would contain the inode number of the inode of the read-only version of the branch file. It would also be possible to create branches off this read-only version. In general, the version inodes and the branch inodes could be linked in a hierarchy of version chains and branch chains depending from the production inode 171.

Create and delete operations in a version set are synchronized. Further write operations, which may allocate blocks, are synchronized with delete operations. A shared global mutex (a version lock) is used to insure the integrity of the version and branch chains while searching the chains for a file and while modifying the chains. To prevent deadlocks, when concurrent locks are taken on more than one file in a chain, the locking should be done from the head of the chain backwards through the chain. For example, when two successive versions are concurrently locked to delete the earlier version, a lock is first taken on the later version, and then a lock is taken on the earlier version.

For each version set, only one create (snap, refresh, restore, etc.) or delete operation may take place at a time. Additional create or delete operations are serialized, because these operations may be changing more than one file in the version set. The create operations are relatively quick and they will hold the global lock for the duration of the operation. Delete operations can take significantly longer. Delete operations are also controlled to prevent multiple delete operations from occurring at the same time. For this purpose, a flag indicating that a delete operation is taking place and a condition variable are maintained in the production file inode.

Typically, a Unix-based file system has a file check facility for checking the integrity of the directories and linkages in a file system. This file check facility is extended to recognize that a production file is in a file version set, and once a file version set is found, to check the integrity of the branch and version chains, and to validate the block pointers, the block ownership, and the block counts of the files in the version set.

Figure 24:
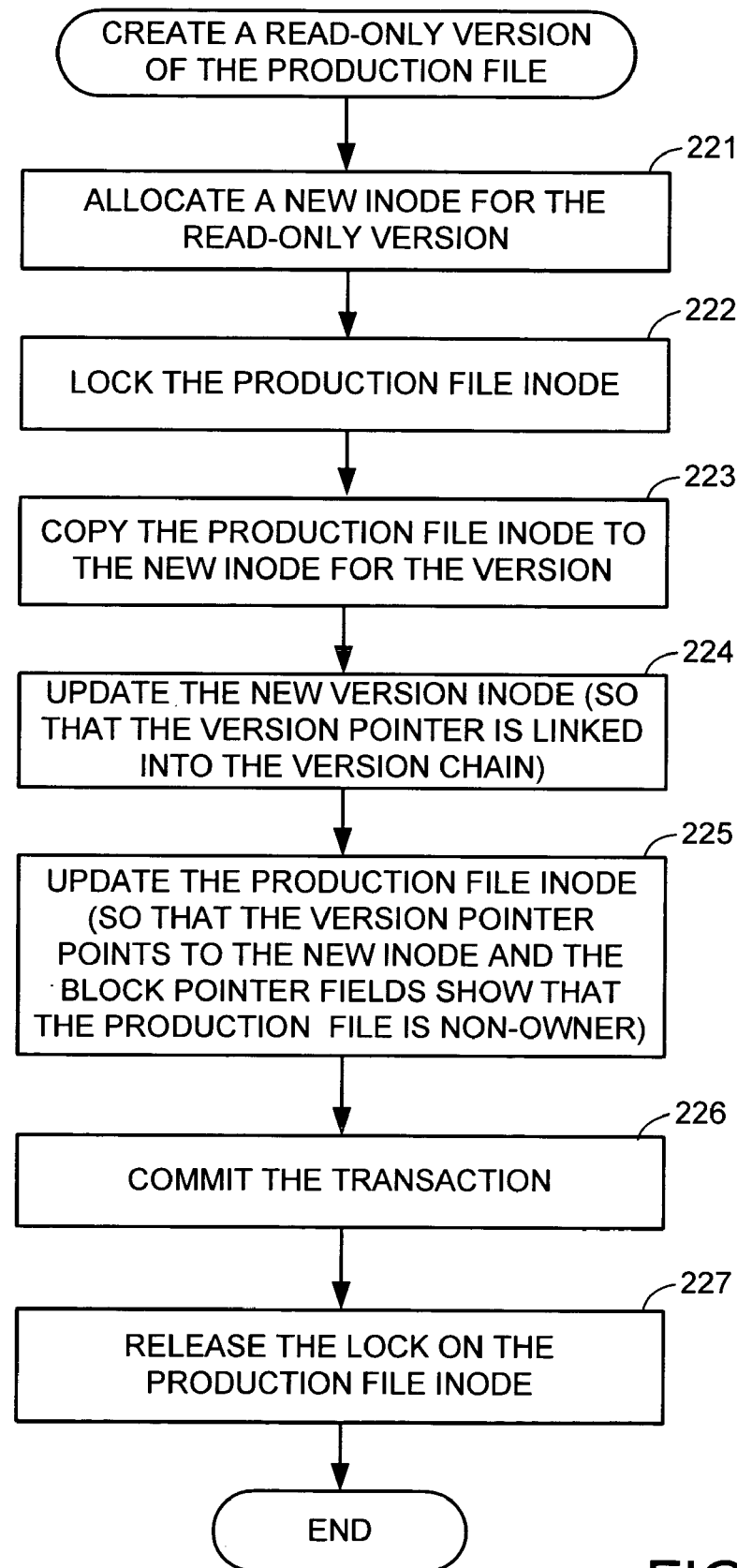
FIG. 24 is a flowchart of a procedure for creating a read-only snapshot copy in the file version set of FIG. 19.

FIG. 24 is a flowchart of a procedure for creating a read-only version of the production file in the file version set of FIG. 19. In a first step 221, a new inode is allocated for the read-only version. Then in step 222, the production file inode is locked. In step 223, the production file inode is copied to the new inode for the version. In step 224, the new version inode is updated; for example, the version pointer is updated to link the new version inode into the version chain off the production inode. In step 225, the production file inode is updated; for example, the version pointer is updated to point to the new version inode and the block pointer fields are updated (by setting the most significant bits to set the non-owner flags) to show that the production file is a non-owner of the pointed-to blocks. Then in step 226, the transaction is committed by writing an entry for the new version creation to the log, and writing the production file inode and the new version inode to the file system in storage. Finally, in step 227, the lock on the production file inode is released.

Figure 25:
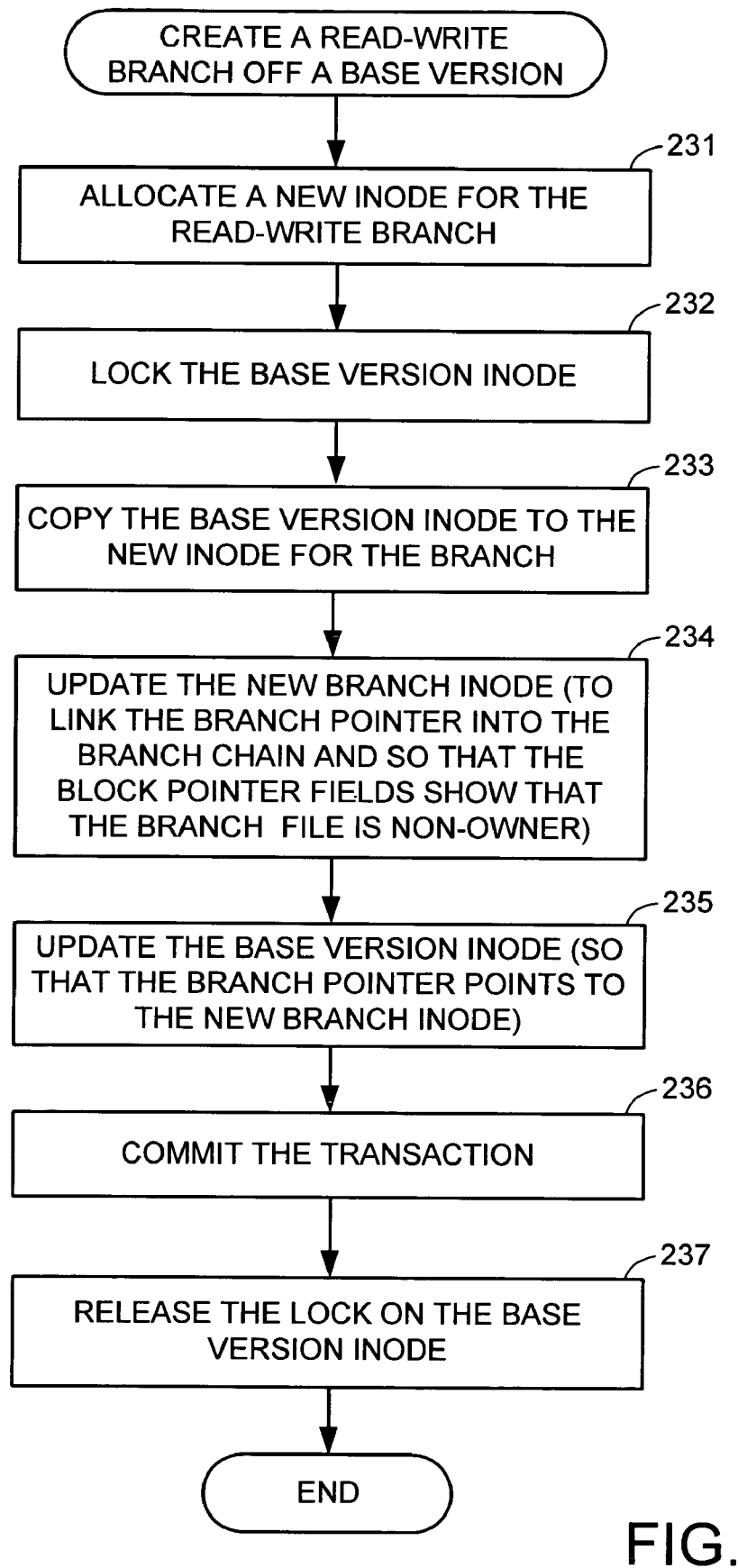
FIG. 25 is a flowchart of a procedure for creating a read-write branch in the file version set of FIG. 19.

FIG. 25 is a flowchart of a procedure for creating a read-write branch off a base version in the file version set of FIG. 19. In a first step 231, a new inode is allocated for the read-write branch. In step 232, the base version inode is locked. Then in step 233, the base version inode is copied to the new inode for the branch. In step 234, the new branch inode is updated; for example, the branch pointer is set to link the new branch inode into the branch chain off the base inode, and the block pointer fields are updated (by setting the non-owner flags in the most significant bits) to indicate that the branch file is a non-owner. In step 235, the base version inode is updated; for example, the branch pointer is set to point to the new branch inode. In step 236, the transaction is committed; for example, by writing an entry into the log indicating the creation of the new read-write branch off the base version, and by writing the new branch inode and the updated base inode to the file system in storage. Finally, in step 237, the lock on the base version inode is released.

Figure 26:
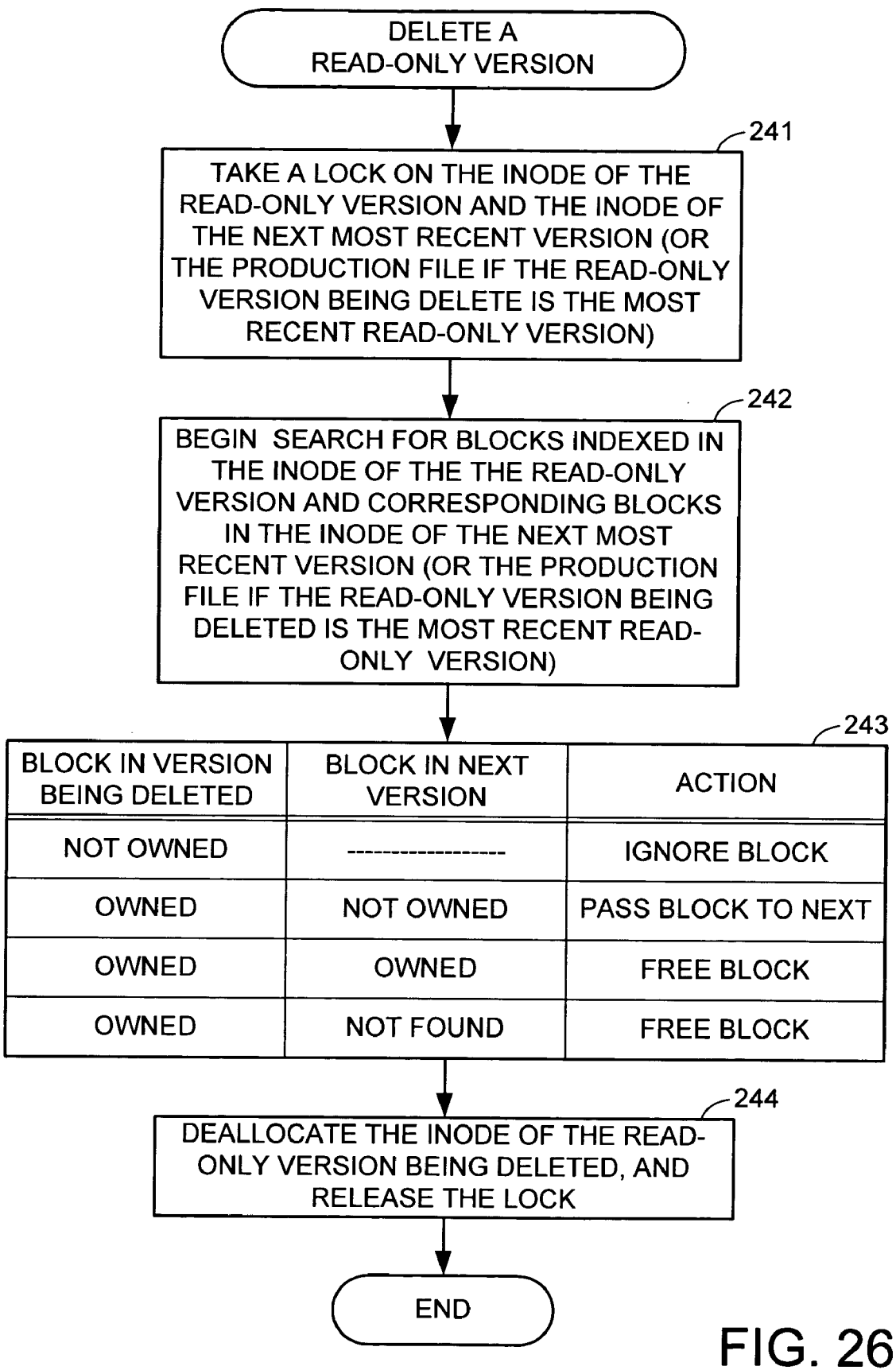
FIG. 26 is a flowchart of a procedure for deleting a read-only version in the file version set of FIG. 19.

FIG. 26 shows a procedure for deleting a read-only version in the file version set of FIG. 19, while retaining the next most recent snapshot copy (or the production file, when the snapshot copy being deleted is the most recent read-only version). This involves deleting blocks that are exclusively owned by the snapshot copy being deleted, and retaining blocks that are shared between the snapshot copy being deleted and the next most recent version.

In a first step 241 of FIG. 26, a lock is taken on the inode of the read-only snapshot copy and the inode of the next most recent snapshot copy (or the production file if the read-only snapshot copy being delete is the most recent read-only version). The lock prevents the deletion operation from changing the file mapping at the same time that new allocations are being done. If the read-only snapshot copy being deleted is the most recent read-only version, then this lock on the production file is taken in shared mode by writes (and allocations) to prevent blocks owned by the most recent version and not owned by the production file from being passed up to the production file (in step 242) at the same time that new blocks are being allocated.

In step 242, there is begun a search for blocks indexed in the inode of the read-only version and corresponding blocks in the inode of the next most recent version (or in the production file if the read-only snapshot copy being deleted is the most recent read-only version). A block in the next most recent version corresponds to a block in the read-only snapshot copy being deleted if the two blocks map to the same range of logical addresses in the two files. The corresponding block may be an identical version of a block (i.e., the same block of storage), in which case the contents will also be the same (because the copy-on-write technique would be used to allocate a new storage block if the contents would change).

The search for the corresponding blocks is referred to as a coalescing pass. The objective is to locate blocks that are exclusively owned by the read-only snapshot copy so that these blocks can be freed. Another objective is to locate shared blocks that are owned by the read-only snapshot copy so that ownership of these blocks can be passed to the next read-only snapshot copy (or the production file if the read-only version being deleted is the most recent read-only version). To carry out these objectives, in step 243, the ownership state of each block in the, version being deleted is inspected, and a corresponding action is taken depending on the ownership of the block. If the block is not owned by the version being deleted, then an identical version of the block is shared with and owned by an earlier snapshot copy. Also, by inheritance, all of the descendants of the block in the block hierarchy are shared with and owned by an earlier snapshot copy. Therefore, the block (and all of its descendants) can be ignored. The searching process skips over the block and all of its descendants.

If the block is owned by the snapshot copy being deleted, then an action is taken depending on the state of the corresponding block in the next most recent version (or the production file if the read-only snapshot copy being deleted is the latest version). If the corresponding block in the next most recent version is not owned, then an identical version of the block is shared between the read-only version being deleted and the next most recent version, and ownership of the block is passed from the read-only version being deleted and the next most recent version. As blocks are passed, the block count is incremented for the next most recent version. If the block being passed is an indirect block, then its descendants become passed by inheritance. However, the indirect block (and any indirect block descendants) should be traversed to count the number of descendants in order to increment the block count for the next most recent snapshot copy by the number of descendants. A function is provided to do the counting for one indirect block, and this function may be called recursively for second and third level indirect trees.

If the block is owned by the read-only file version being deleted and the corresponding block in the next most recent file snapshot is owned by the next most recent version, then the block was modified between the read-only snapshot being deleted and the next most recent version. In this case, the read-only snapshot copy being deleted has exclusive ownership of its version of the block, and its version of the block can be freed. If the block is not found in the next most recent version (for example because the extent of the file had been reduced), then the read-only snapshot copy being deleted has exclusive ownership of the block, and the block can be freed.

Finally, in step 244, when the search for blocks has been completed, the inode of the read-only snapshot copy being deleted is deallocated, and the lock is released.

The deletion of blocks from the read-only snapshot copy being deleted can be done in such a way that truncation occurs from the end of the file backwards. In this case, the file size can be used as a processing indicator, and the deletion process can be halted and restarted. The coalescing and cleanup of the file can be done asynchronously, although only one file deletion from the version set will be performed at any given time.

In a preferred implementation, the coalescing and cleanup of a file is done by a program loop that executes a series of transactions. Each pass through the program loop executes one transaction. Each transaction is logged, so the coalescing and cleanup can be resumed if interrupted by a system crash. During each transaction, an exclusive lock is held on the next most recent version (or the production file, if the snapshot copy being deleted is the most recent read-only version). This prevents any attempt to allocate blocks in the locked file. The exclusive lock is released at the end of processing for each transaction, in order for any conflicting processes to make forward progress.

The process of deleting versions can be simplified when all of the files in the version set are deleted. In this case, all of the blocks in the version set are deallocated. In addition, the deletion of multiple successive versions can be optimized. Only a single coalescing pass is needed to pass blocks that are owned by the successive versions being deleted but shared with the next most recent version being retained. There is no need to pass blocks between two successive versions that will both be deleted.

There is no need for passing blocks when a branch file is deleted. Any blocks that are owned by the branch are deallocated, and any non-owner blocks are ignored.

Figure 27:
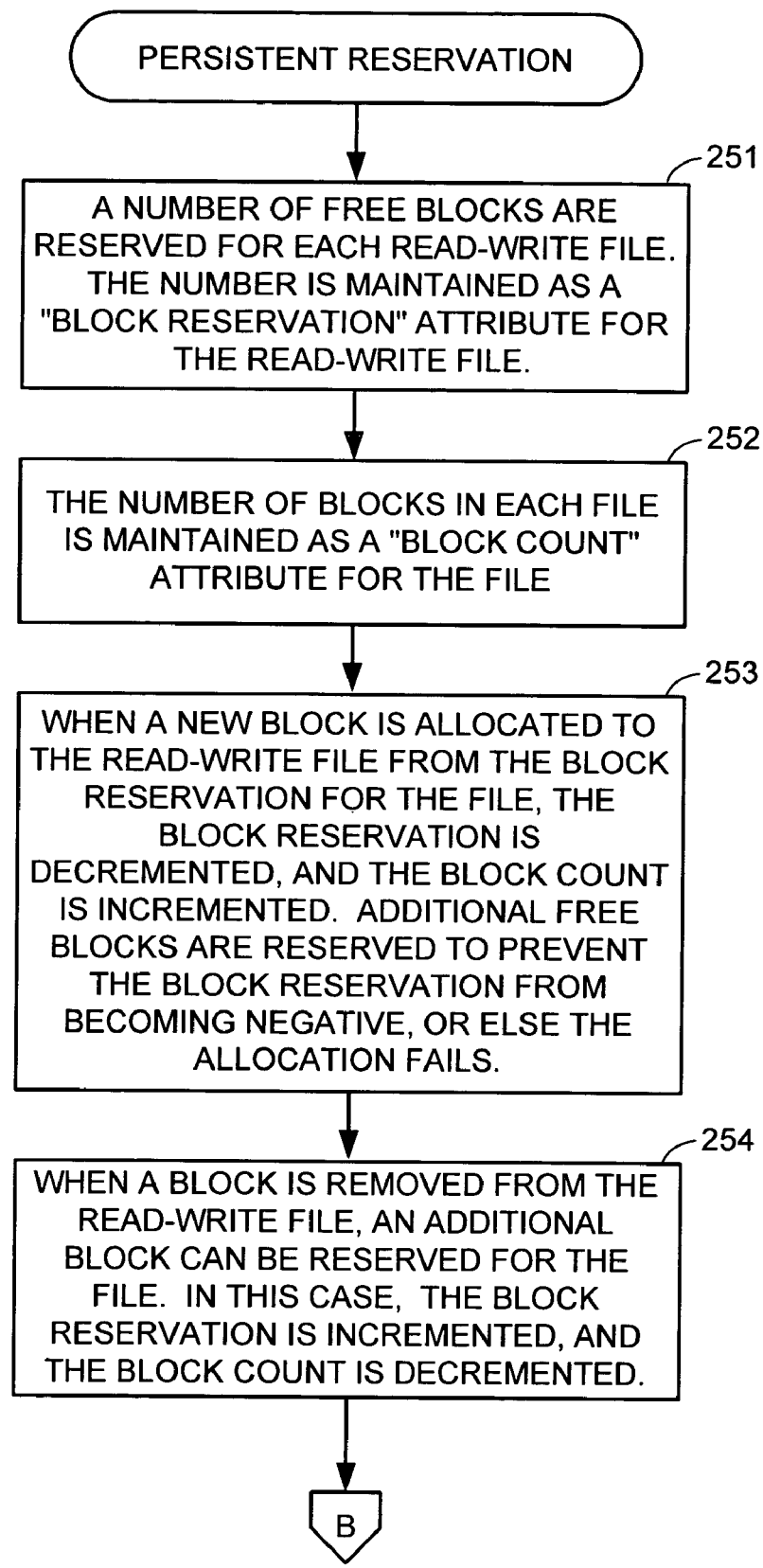
FIGS. 27-28 comprise a flowchart of a procedure for reserving file blocks for read-write files in order to ensure that the sharing of file blocks among the files in the version set of FIG. 19 is not likely to result in a shortage of file blocks when writing to the read-write files.
Figure 28:
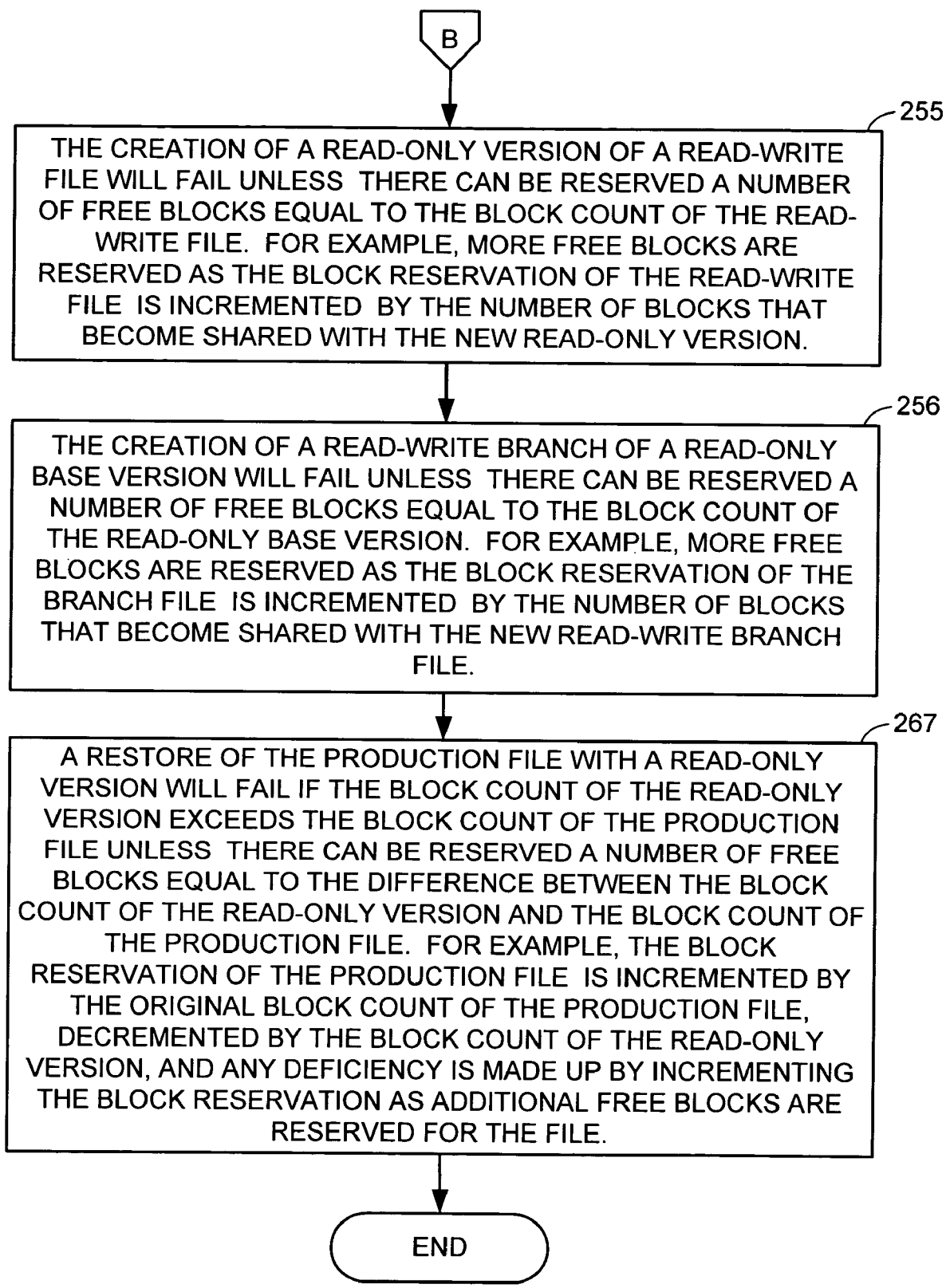

FIGS. 27-28 show details of the persistent reservation mechanism ensuring that the sharing of file blocks among the files in the version set of FIG. 19 is not likely to result in a shortage of file blocks when writing to the production file or a branch file. In a first step 251, a number of free blocks are reserved for each read-write file. The number is maintained as a "block reservation" attribute for the read-write file. In step 252, the number of blocks in each file is maintained as a "block count" attribute for the read-write file. In step 253, when a new block is allocated to the read-write file from the block reservation for the file, the block reservation is decremented, and the block count is incremented. Additional free blocks are reserved to prevent the block reservation from becoming negative, or else the allocation fails. In step 254, when a block is removed from the read-write file, then an additional block can be reserved for the file. In this case, the block reservation for the file is incremented, and the block count for the file is decremented.

Continuing in step 255 of FIG. 28, the creation of a read-only snapshot copy of a read-write file will fail unless there can be reserved a number of free blocks equal to the block count of the read-write file. For example, more free blocks are reserved as the block reservation count of the read-write file is incremented by the number of blocks that become shared with the new read-only file.

In step 256, the creation of a read-write branch of a read-only base snapshot copy will fail unless there can be reserved a number of free blocks equal to the block count of the read-only base version. For example, more free blocks are reserved as the block reservation of the branch file is incremented by the number of blocks that become shared with the new read-write branch file.

In step 267, a restore of the production file with a read-only snapshot copy will fail if the block count of the read-only snapshot copy exceeds the block count of the production file unless there can be reserved a number of free blocks equal to the difference between the block count of the read-only snapshot copy and the block count of the production file. For example, the block reservation of the production file is incremented by the original block count of the production file, decremented by the block count of the read-only version, and any deficiency is made up by incrementing the block reservation as additional free blocks are reserved for the production file.

Figure 29:
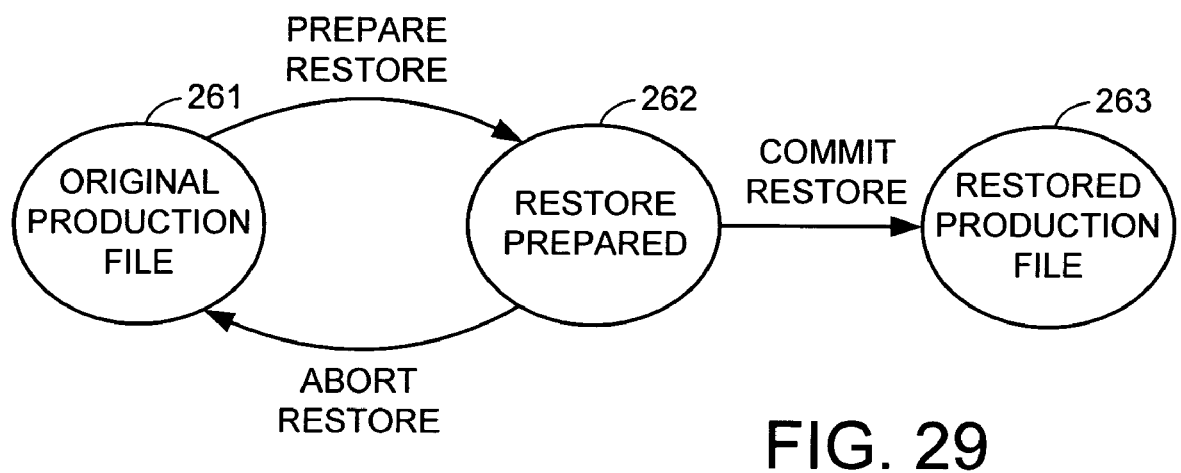
FIG. 29 is a state diagram for the process of restoring a production file with a read-only version.

FIG. 29 is a state diagram for the process of restoring a production file with a read-only version. The state diagram has an initial state 261 of the original production file, an intermediate state 262 in which the version set has been prepared for a restore operation, and a final state 263 in which the production file has been restored. The process of restoring the production file is provided with a distinct intermediate state because it is possible that the restore operation may fail or it may be desirable to provide the user with an option to abort the restoration process, for example, because sufficient free file system blocks are not available to satisfy the persistent reservation requirement. Therefore, the restoration process has been configured for a two-phase commit process, in which the first phase is to prepare for a restore operation, and the second phase is to either abort the restore operation or commit the restore operation.

Once a process capable of failure has been configured for such a two-phase commit process, then it can be used in the well-known two-phase distributed commitment protocol. In the two-phase distributed commitment protocol, the preparation and commitment can be done at multiple distributed sites under management of a single controller. In the first phase, the preparation at all of the sites is performed at the request of the controller, and the results are reported back to the controller. If all sites report back that the preparation has been successful, then the controller may request all of the sites to commit to completing the process. In this case, it is highly probable that the process will be completed everywhere. However, if any one of the sites reports back that its preparation has been unsuccessful, then the controller may request all of the sites to abort their preparation.

For restoring files, the two-phase distributed commitment protocol could be useful for preparing to restore multiple files in a distributed data storage system. The files could be distributed across a network and stored in different network file servers. If the preparation for restoration of all of the files would be successful, then the restoration of all of the files would be committed. If the preparation for restoration of any of the files would be unsuccessful, then the restoration of all of the files would be aborted. The preparation for the restoration process could ensure, to a high probability, that all of the files in the file system could be restored together, or else none of them would be restored.

Figure 30:
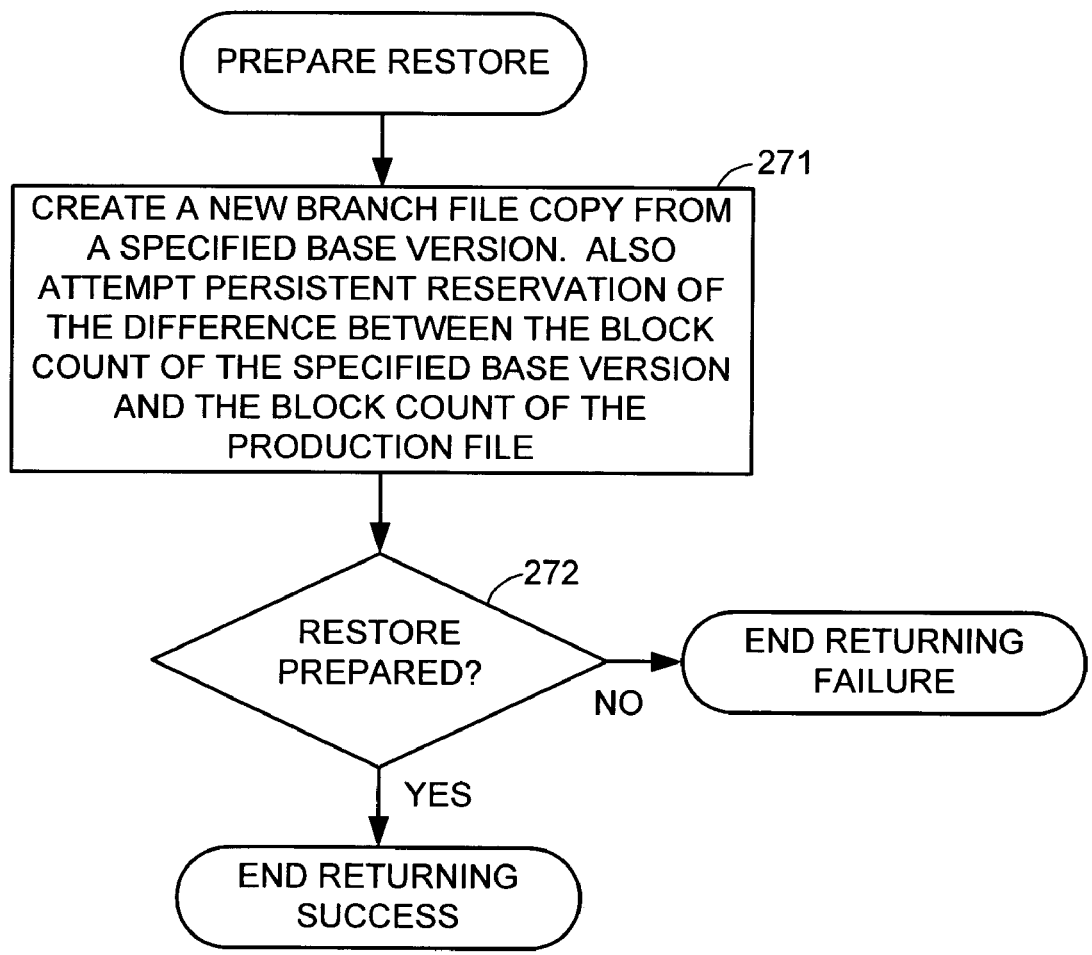
FIG. 30 is a flowchart of a procedure for preparing for the restoration of the production file with a read-only version.

FIG. 30 shows a procedure for preparing for the restoration of the production file. In a first step 271, a branch file copy is created from a specified base version. The base version is the read-only snapshot copy to be used for restoring the production file. Also an attempt is made to reserve the difference between the block count of the specified base version and the block count of the production file. In step 272, if the restoration has been prepared, then execution returns reporting success. Otherwise, execution returns reporting failure. For example, execution could return with a fatal error if the specified base version has been corrupted so that no branch file copy could be created. Execution could also return with an indication that creation of the branch file copy was successful but there were insufficient resources for persistent reservation.

Figure 31:
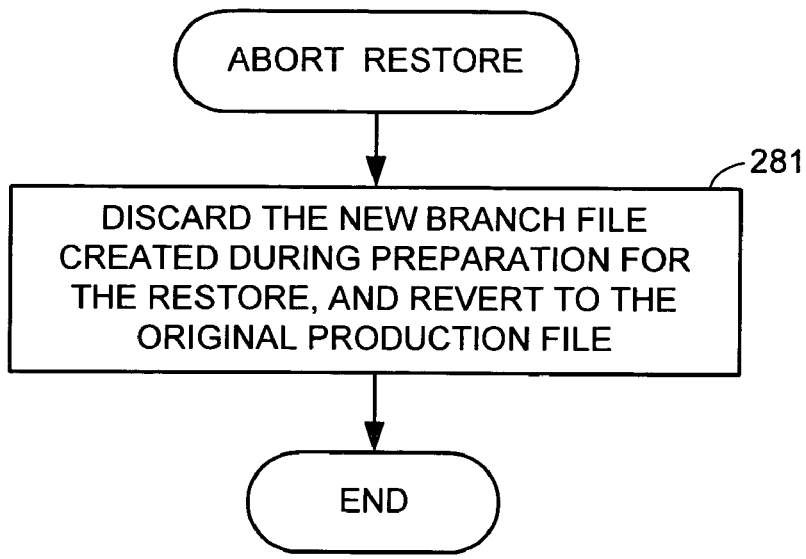
FIG. 31 is a flowchart of a procedure for aborting the restoration of the production file with a read-only version.

FIG. 31 shows a procedure for aborting the restoration of the production file. In step 281, the new branch file (created during preparation for the restore) is discarded. Read-write access may continue with the original production file.

Figure 32:
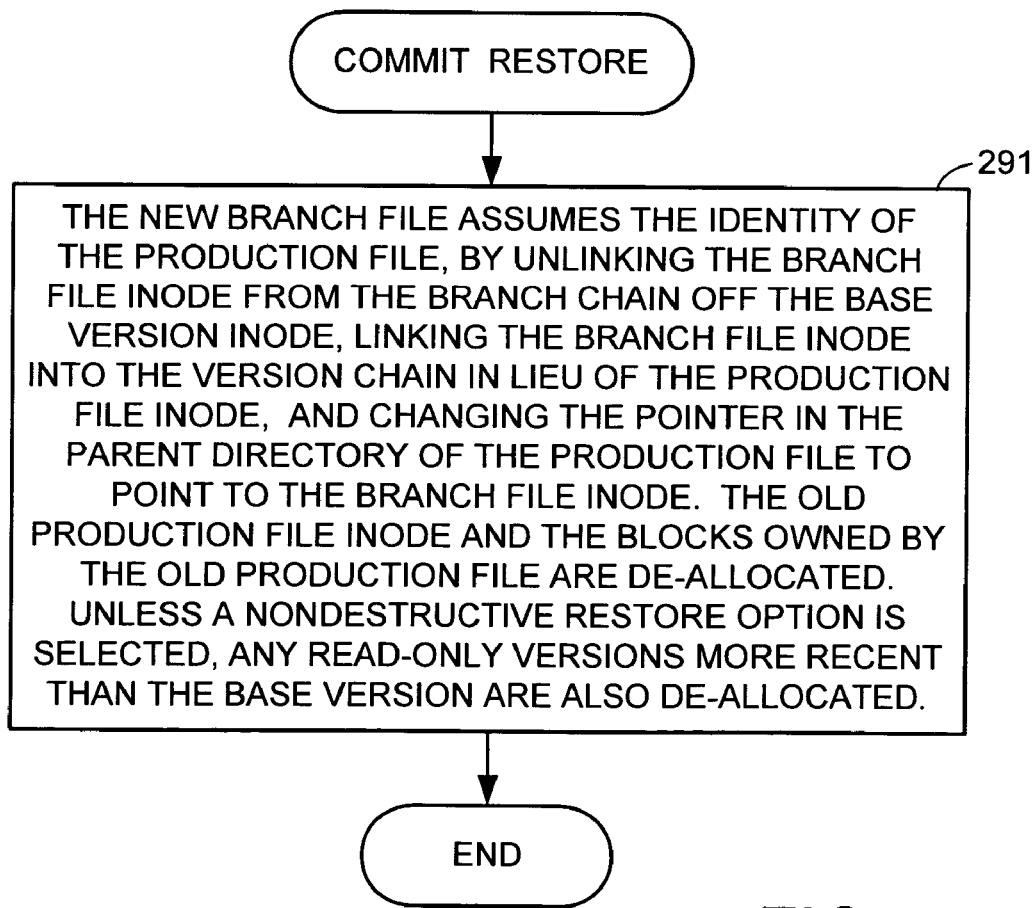
FIG. 32 is a flowchart of a procedure for committing the restoration of the production file with a read-only version.

FIG. 32 shows a procedure for committing the restoration of the production file. In step 291, the new branch file (created during the preparation for the restore) assumes the identity of the production file. This is done by unlinking the branch file inode from the branch chain off the base version inode, linking the branch file inode into the version chain in lieu of the production file inode, and changing the pointer in the parent directory of the production file to point to the branch file inode in lieu of the production file inode. Then the old production file inode and the blocks owned by the old production file are deallocated. Unless a nondestructive restore option is selected, any read-only versions more recent than the base version are also deleted by deallocating all of their owned blocks and then deallocating their inodes.

Figure 33:
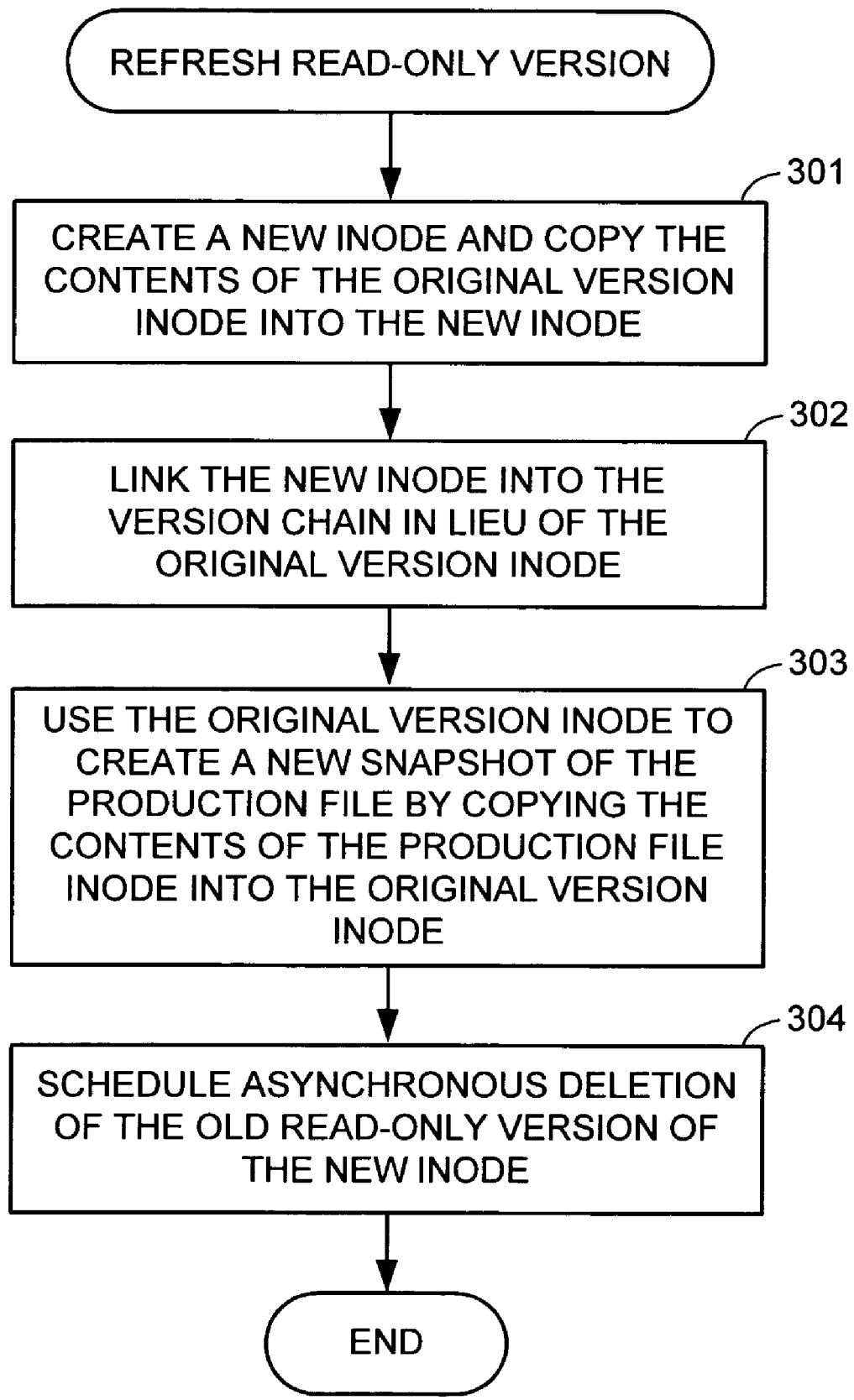
FIG. 33 is a flowchart of a procedure for refreshing a read-only version.

A refresh of a read-only snapshot copy takes an existing version file, discards it contents, and creates a new version for the snapshot file. The new version is a snapshot copy of the present state of the production file. FIG. 33 shows a preferred procedure. In step 301, a new inode is created, and the contents of the original version inode are copied into the new inode. In step 302, the new inode is linked into the version chain in lieu of the original version inode. In step 303, the original version inode is used to create a new snapshot of the production file. In other words, the production file inode is copied to the original version inode, the original version inode is linked into the version chain as the most recent version, and the non-owner flags are set in the production file inode. Then in step 304, the old read-only snapshot copy of the new inode is scheduled for asynchronous deletion. In this fashion, the refreshed snapshot can become available for user access before the old snapshot copy is deleted.

It is desirable to provide users with a convenient method of referencing the various files in a version set. A preferred method is to provide a hierarchical naming convention similar to a hierarchical path name common for Unix-based file; for example, a path name for a Unix-based file is typically in the form of:

DirectoryName\SubDirectoryName\ . . . \FileName.

For referencing files in a version set, a suitable hierarchical naming convention is in the form of:

ProductionFileName [$VersionName][$$BranchName] . . .

In other words, a single occurrence of the "$" symbol is used as a delimiter to indicate a following version name, and a double occurrence of the "$$" symbol is used as a delimiter to indicate a following branch name. In accordance with this convention, the six files in the version set of FIG. 19 could have the following file names:

| | |
|---|---|
| Production Inode 171: | ProductionFileName |
| Version 1 Inode 172: | ProductionFileName$1 |
| Version 2 Inode 173: | ProductionFileName$2 |
| Version 1 Inode 174: | ProductionFileName$3 |
| Branch 1 Inode 175: | ProductionFileName$3$$1 |
| Branch 2 Inode 176: | ProductionFileName$3$$2 |

This naming convention would have the advantage that all of the files in the version set could share the same NFS file handle or CIFS file id. In addition, the naming convention would have the advantage that a file name matching the pattern could trigger the creation of a new snapshot copy or branch file. For example, if a request to create a new version specified an existing production file name followed by the delimiter "$" followed by a version name that did not exist, then a new snapshot of the production file would be created having the specified version name. The file handle returned would be that of the production file.

Figure 34:
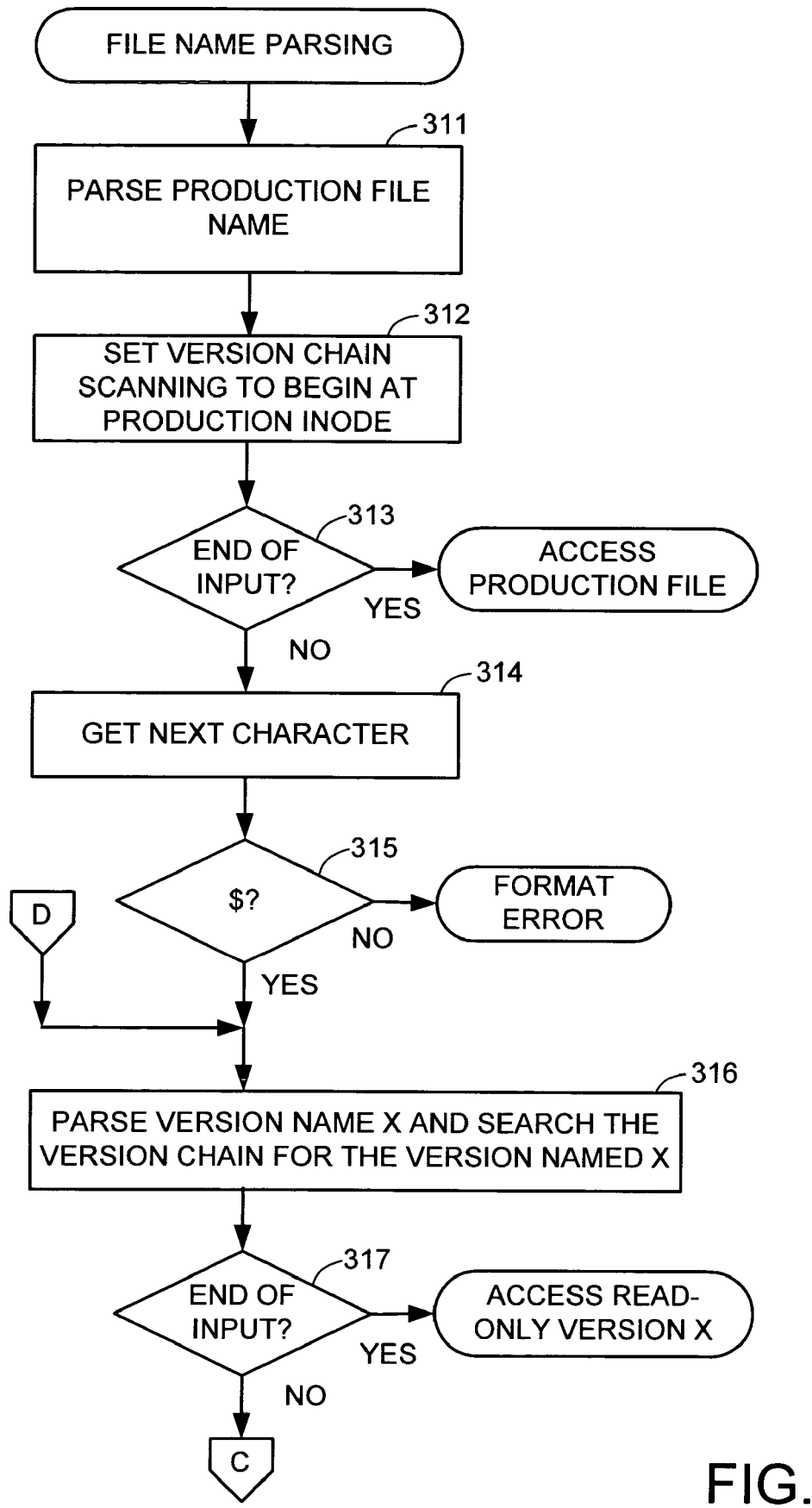
FIGS. 34 and 35 comprise a flowchart of a procedure for parsing a file name for a file in the version set of FIG. 19.
Figure 35:
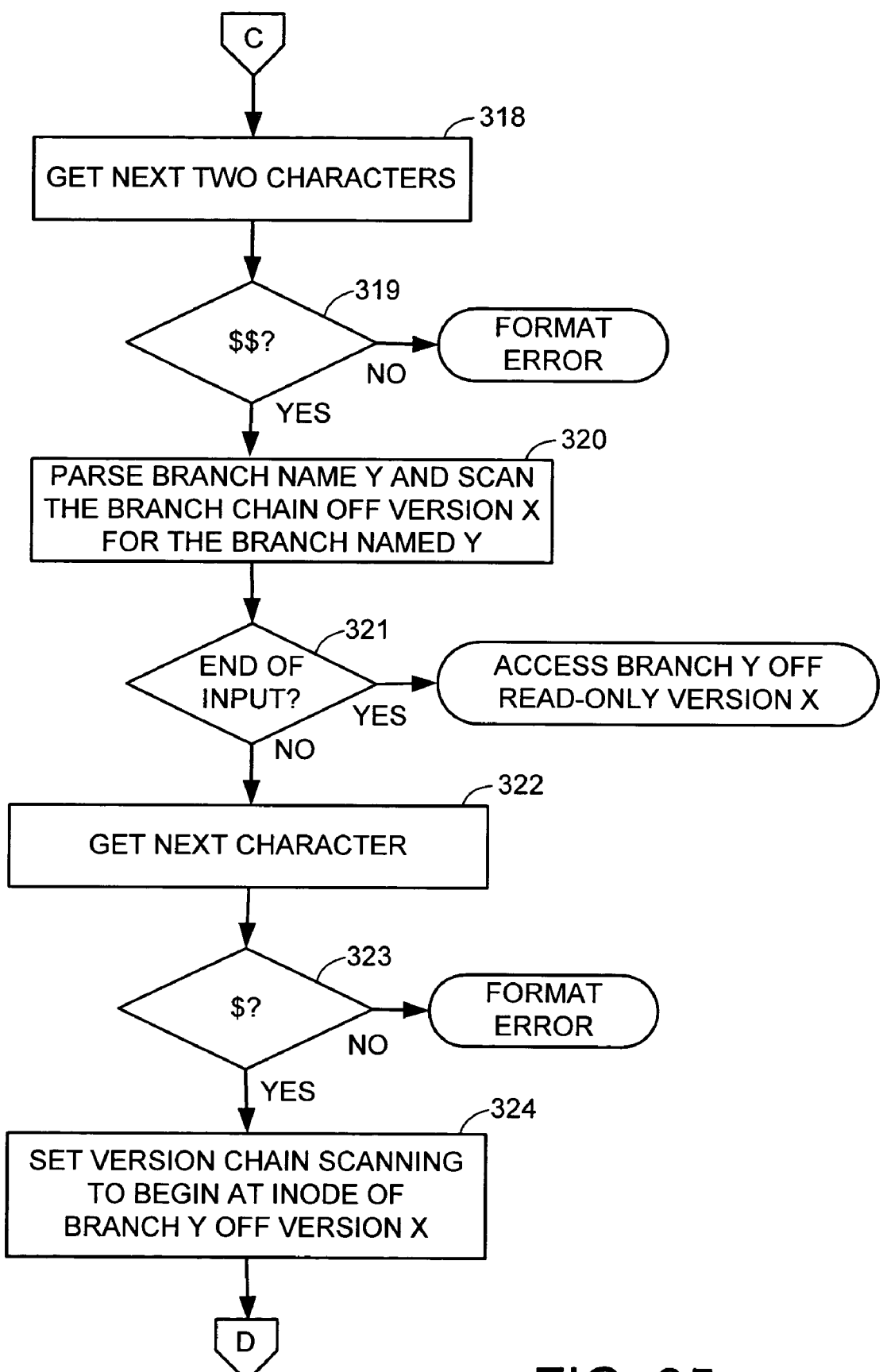

FIGS. 34 and 35 show a procedure for parsing a file name in accordance with the above convention. In a first step 311, version chain scanning is set to begin at the production inode. Then in step 312, the production file name is parsed from the name of the file in the version set. In step 313, if an end of input is reached in the parsing of name of the file in the version set, then execution returns indicating that the production file is to be accessed. Otherwise, execution continues to step 314 to get the next character from the file name input. In step 315, if this next character is not the "$" character, then execution returns reporting a format error. Otherwise, execution continues to step 316; to parse a version name X and scan the version chain until the inode is found for the version named X. In step 317, if an end of input is reached in the parsing of the version number, then execution returns indicating that the read-only version X of the production file system is to be accessed. Otherwise, execution continues to step 318 in FIG. 35.

In step 318 of FIG. 35, the next two characters are obtained from the input of the name of the file in the version set. In step 319, the next two characters are not "$$", then execution returns reporting a format error. Otherwise, execution continues to step 320 to parse a branch name Y and scan the branch chain off the version named X until the branch named Y is found. In step 321, if an end of input of the name of the file in the version set has been reached, then execution returns indicating that the branch Y off the read-only snapshot copy X is to be accessed. Otherwise, execution continues to step 322. In step 322, the next character is obtained from the input of the name of the file in the version set. In step 323, if the next character is not "$", then execution returns reporting a format error. Otherwise, execution continues to step 324 to set the version chain scanning to begin at the inode of branch Y of version X. After step 324, execution loops back to step 316 of FIG. 34.

An alternative naming convention could use a directory for the version set. The directory could have an entry for each file in the version set, and an arbitrary name could be assigned to each file in the version set. The directory for the version set could provide a means for locating a branch file that would become unlinked from its base version when its base version is deleted, or locating versions that might be retained after deletion of the production file. This alternative, however, involves additional processing overhead for maintaining the directory entries and keeping track of the directory itself.

Another alternative is to use pseudo directories. Each pseudo directory could have a version date or user supplied label associated with it. Also, it could have a specific file system version level number. Reading the pseudo directory could return a list the files that had a version number less than or equal to the version number of the pseudo directory. This has an advantage in that it is somewhat easier to manage older file versions, since they are collected together in the pseudo directories. This alternative would require the production file to exist as a name anchor and would also involve additional processing time for maintaining the pseudo directories.

In view of the above, there has been described a way of creating read-only and read-write snapshot copies of a production file in a Unix-based file system. The production file and the snapshot copies are organized as a version set of file inodes and file blocks including blocks that are shared among the snapshots and the production file. The inodes in the version set are linked together by version pointers and branch pointers. The user is able to choose only those production files and snapshots that are considered important enough to be copied and saved. This has the advantage of improving both performance and storage efficiency. A protocol is provided for creating read-only and read-write versions, deleting read-only and read-write versions, restoring the production version with a specified version, refreshing a specified version, and naming the files in the version set. The production file can be created as a fully pre-allocated file by pre-allocation of all of its blocks in the file system at creation time, or as a sparse file whose inode is allocated at creation time and whose other blocks are allocated as needed when its data blocks are written to.

When writing to a file block that is shared between the production file and a read-only version, a new block is allocated to the production file. The contents of the shared block are written to the new block if there is a partial write to the new block. This copy-on-write technique is complicated by the presence of indirect blocks, which may also need to be copied. To solve this problem, block pointers are marked with a flag indicating whether or not the pointed-to block is owned by the parent inode. A non-owner marking is inherited by all of the descendants of a block. The block ownership controls the copying of indirect blocks when writing to the production file, and also controls deallocation and passing of blocks when deleting a specified read-only version.

What is claimed is:

1. A file server comprising:
   storage containing a file system; and
   a processor coupled to the storage for accessing the file system;
   wherein the file system includes a production file, read-only snapshot copies of the production file, and at least one read-write snapshot copy of the production file;
   wherein the production file and the snapshot copies of the production file are organized as a version set; the version set including an inode for the production file and an inode for each snapshot copy of the production file, and a set of file blocks including data blocks and indirect blocks that are shared among the production file and the snapshot copies of the production file;
      wherein the inodes in the version set include pointer fields, and wherein each pointer field includes a pointer to a block in the version set and a flag indicating whether or not the version of the production file of the inode is an oldest snapshot copy of the production file including an identical version of the block pointed to by the pointer in said each pointer field; and
      wherein the file server is programmed to maintain for each block in each read-only snapshot copy of the production file an indication of whether or not said each snapshot copy of the production file is an oldest snapshot copy of the production file including an identical version of said each block by maintaining said flag indicating whether or not the version of the production file of the inode is an oldest snapshot copy of the production file including an identical version of the block pointed to by the pointer in said each pointer field.

2. The file server as claimed in claim 1, wherein each inode of each read-only snapshot copy of the production file is linked to a hierarchy of blocks included in said each read-only snapshot copy of the production file, the inode of said each read-only snapshot copy of the production file includes an indication of whether or not said each read-only snapshot copy of the production file is an oldest read-only snapshot copy of the production file including an identical version of each block that is a child of said each inode in the hierarchy of blocks included in said each read-only snapshot copy of the production file, and when said each read-only snapshot copy of the production file is not an oldest read-only snapshot copy of the production file including an identical version of said each block that is a child of said each inode in the hierarchy the of blocks, then said each read-only snapshot copy of the production file is not an oldest read-only snapshot copy of the production file including an identical version of each descendant of said each block that is a child of said each inode in the hierarchy of the blocks.

3. The file server as claimed in claim 1, which is programmed to delete a read-only snapshot copy of the production file, and when deleting the read-only snapshot copy of the production file, to keep each block for which the read-only snapshot copy is not indicated as being an oldest snapshot copy of the production file including an identical version of said each block.

4. The file server as claimed in claim 3, wherein each inode of each read-only snapshot copy of the production file is linked to a hierarchy of blocks included in said each read-only snapshot copy of the production file, and wherein the file server is further programmed to keep all descendants of said each block for which the read-only snapshot copy is not indicated as being an oldest snapshot copy of the production file including an identical version of said each block.

5. The file server as claimed in claim 1, which is programmed to delete a read-only snapshot copy of the production file, and when deleting the read-only snapshot copy of the production file, to keep each block for which the read-only snapshot copy of the production file is indicated as being an oldest snapshot copy of the production file including an identical version of said each block and a next-most recent version of the production file is indicated as not being an oldest snapshot copy of the production file including an identical version of said each block.

6. The file server as claimed in claim 5, which is further programmed, upon deleting the read-only snapshot copy of the production file, to indicate that the next-most recent snapshot copy of the production file has become an oldest snapshot copy of the production file including an identical version of said each block for which the read-only snapshot copy of the production file is indicated as being an oldest snapshot copy of the production file including an identical version of said each block and a next-most recent snapshot copy of the production file is indicated as not being an oldest snapshot copy of the production file including an identical version of said each block.

7. The file server as claimed in claim 1, which is programmed to delete a read-only snapshot copy of the production file by deallocating each block for which the read-only snapshot copy is indicated as an oldest read-only snapshot copy of the production file including an identical version of said each block and a next most recent read-only snapshot copy of the production file is also indicated as an oldest read-only snapshot copy of the production file including an identical version of a block corresponding to said each block, wherein said each block and the block corresponding to said each block are mapped to the same logical file addresses.

8. A file server comprising:
storage containing a file system; and
a processor coupled to the storage for accessing the file system;
wherein the file system includes a production file, and read-only snapshot copies of the production file;
wherein the production file and the read-only snapshot copies of the production file are organized as a version set; the version set including an inode for the production file, an inode for each read-only snapshot copy of the production file, and a set of file blocks including data blocks and indirect blocks that are shared among the production file and the read-only snapshot copies of the production file;
wherein the inodes in the version set include pointer fields, and wherein each pointer field includes a pointer to a block in the version set and a flag indicating whether or not the version of the production file of the inode is an oldest snapshot copy of the production file including an identical version of the block pointed to by the pointer in said each pointer field;
wherein the file server is programmed to maintain for each block in each snapshot copy of the production file an indication of whether or not said each snapshot copy of the production file is an oldest snapshot copy of the production file including an identical version of said each block by maintaining said flag indicating whether or not the version of the production file of the inode is an oldest snapshot copy of the production file including an identical version of the block pointed to by the pointer in said each pointer field; and
wherein the file server is programmed to delete a read-only snapshot copy of the production file, and when deleting the read-only snapshot copy of the production file, to keep each block for which the read-only snapshot copy is not indicated as being an oldest snapshot copy of the production file including an identical version of said each block.

9. The file server as claimed in claim 8, wherein each inode of each read-only snapshot copy of the production file is linked to a hierarchy of blocks included in said each read-only snapshot copy of the production file, and wherein the file server is further programmed, upon deleting the read-only snapshot copy of the production file, to keep all descendants of said each block for which the read-only snapshot copy is not indicated as being an oldest snapshot copy of the production file including an identical version of said each block.

10. The file server as claimed in claim 8, which is further programmed, upon deleting the read-only snapshot copy of the production file, to keep each block for which the read-only snapshot is indicated as being an oldest snapshot copy of the production file including an identical version of said each block and a next-most recent snapshot copy of the production file is indicated as not being an oldest snapshot copy of the production file including an identical version of said each block.

11. The file server as claimed in claim 10, which is further programmed, upon deleting the read-only snapshot copy of the production file, to indicate that the next-most recent snapshot copy of the production file has become an oldest snapshot copy of the production file including an identical version of said each block for which the read-only snapshot is indicated as being an oldest snapshot copy of the production file including an identical version of said each block and a next-most recent snapshot copy of the production file is indicated as not being an oldest snapshot copy of the production file including an identical version of said each block.

12. The file server as claimed in claim 8, which is further programmed, upon deleting the read-only snapshot copy of the production file, to deallocate each block for which the read-only snapshot copy is indicated as an oldest snapshot copy of the production file including an identical version of said each block and a next most recent snapshot copy of the production file is also indicated as an oldest snapshot copy of the production file including an identical version of a block corresponding to said each block, wherein said each block and the block corresponding to said each block are mapped to the same logical file addresses.

13. A method of operating a file server; the file server including storage containing a file system, and the file server also including a processor coupled to the storage for accessing the file system; the file system including a production file and read-only snapshot copies of the production file; the production file and the read-only snapshot copies of the production file being organized as a version set; the version set including an inode for the production file, an inode for each read-only snapshot copy of the production file, and a set of file blocks including data blocks and indirect blocks that are shared among the production file and the read-only snapshot copies of the production file, said method comprising:
maintaining for each block in each snapshot copy of the production file an indication of whether or not said each snapshot copy of the production file is an oldest snapshot copy of the production file including an identical version of said each block; and
deleting a read-only snapshot copy of the production file, wherein the deleting of the read-only snapshot copy of the production file includes keeping each block for which the read-only snapshot copy is not indicated as being an oldest snapshot copy of the production file including an identical version of said each block;

wherein the inodes in the version set include pointer fields, and each pointer field includes a pointer to a block in the version set and a flag indicating whether or not the version of the production file of the inode is an oldest snapshot copy of the production file including an identical version of the block pointed to by the pointer in said each pointer field, and wherein the step of maintaining for each block in each snapshot copy of the production file an indication of whether or not said each snapshot copy of the production file is an oldest snapshot copy of the production file including an identical version of said each block includes maintaining said flag to indicate whether or not the version of the production file of the inode is an oldest snapshot copy of the production file including an identical version of the block pointed to by the pointer in said each pointer field.

14. The method as claimed in claim 13, wherein each inode of each read-only snapshot copy of the production file is linked to a hierarchy of blocks included in said each read-only snapshot copy of the production file, and wherein the deleting of the read-only snapshot copy of the production file includes keeping all descendants of said each block for which the read-only snapshot copy is not indicated as being an oldest snapshot copy of the production file including an identical version of said each block.

15. The method as claimed in claim 13, wherein the deleting of the read-only snapshot copy of the production file further includes keeping each block for which the read-only snapshot copy of the production file is indicated as being an oldest snapshot copy of the production file including an identical version of said each block and a next-most recent snapshot copy of the production file is indicated as not being an oldest snapshot copy of the production file including an identical version of said each block.

16. The method as claimed in claim 15, which further includes, upon deleting the read-only snapshot copy of the production file, indicating that the next-most recent snapshot copy of the production file has become an oldest snapshot copy of the production file including an identical version of said each block for which the read-only snapshot copy of the production file is indicated as being an oldest snapshot copy of the production file including an identical version of said each block and a next-most recent snapshot copy of the production file is indicated as not being an oldest snapshot copy of the production file including an identical version of said each block.

17. The method as claimed in claim 13, wherein the deleting of the read-only snapshot copy of the production file includes deallocating each block for which the read-only snapshot copy of the production file is indicated as being an oldest snapshot copy of the production file including an identical version of said each block and a next most recent snapshot copy of the production file is also indicated as being an oldest snapshot copy of the production file including an identical version of a block corresponding to said each block, wherein said each block and the block corresponding to said each block are mapped to the same logical file addresses.

* * * * *